US009710515B2

(12) United States Patent
Idei et al.

(10) Patent No.: US 9,710,515 B2
(45) Date of Patent: Jul. 18, 2017

(54) ANALYSIS SYSTEM, COMPUTER SYSTEM, AND ANALYSIS METHOD FOR ANALYZING BEHAVIOR OF DATABASE MANAGEMENT SYSTEM

(75) Inventors: Hideomi Idei, Tokyo (JP); Norifumi Nishikawa, Tokyo (JP); Nobuo Kawamura, Tokyo (JP); Kazuhiko Mogi, Tokyo (JP); Masaru Kitsuregawa, Tokyo (JP); Masashi Toyoda, Tokyo (JP); Kazuo Goda, Tokyo (JP)

(73) Assignees: Hitachi, Ltd., Tokyo (JP); The University of Tokyo, Tokyo (JP)

( * ) Notice: Subject to any disclaimer, the term of this patent is extended or adjusted under 35 U.S.C. 154(b) by 294 days.

(21) Appl. No.: 14/404,525

(22) PCT Filed: May 31, 2012

(86) PCT No.: PCT/JP2012/064151
§ 371 (c)(1),
(2), (4) Date: Nov. 28, 2014

(87) PCT Pub. No.: WO2013/179453
PCT Pub. Date: Dec. 5, 2013

(65) Prior Publication Data
US 2015/0149439 A1    May 28, 2015

(51) Int. Cl.
*G06F 7/00*      (2006.01)
*G06F 17/30*    (2006.01)

(52) U.S. Cl.
CPC .. *G06F 17/30445* (2013.01); *G06F 17/30557* (2013.01)

(58) Field of Classification Search
None
See application file for complete search history.

(56) References Cited

U.S. PATENT DOCUMENTS 6,353,916 B1 * 3/2002 Kuwayama ......... G06F 17/5031
716/108
7,574,424 B2 * 8/2009 Chowdhuri ....... G06F 17/30445
(Continued)

FOREIGN PATENT DOCUMENTS

| JP | 2007-034414 A | 2/2007 |
| JP | 2007-199804 A | 8/2007 |
| JP | 2012-059130 A | 3/2012 |

OTHER PUBLICATIONS

Mustafa Uysal et al, "Requirements of I/O Systems for Parallel Machines: An Application-driven Study", drum.lib.umd.edu, 1998, 16 pages.*

(Continued)

*Primary Examiner* — Uyen Le
(74) *Attorney, Agent, or Firm* — Mattingly & Malur, PC

(57) ABSTRACT

This analysis system analyzes the behavior of a DBMS in a computer system having a computer which executes tasks in parallel and reads data from a database (DB) when executing a query. This analysis system acquires the number of selected rows corresponding to a key value of an index key used in the query, and calculates a model-based predicted degree of processing parallelism of the processing corresponding to the query. The system acquires, from the storage device, event information on an input-output event with respect to the storage medium when the processing corresponding to the query is executed actually, calculates a measured degree of processing parallelism when the processing corresponding to the query is executed actually, based on the event information, and displays information based on the model-based predicted degree of processing parallelism and the measured degree of processing parallelism.

25 Claims, 34 Drawing Sheets

(56) References Cited

U.S. PATENT DOCUMENTS

| | | | |
|---|---|---|---|
| 8,533,730 B2* | 9/2013 | Ito | G06F 9/5083 |
| | | | 707/713 |
| 9,208,197 B2* | 12/2015 | Kashyap | G06F 9/3885 |
| 2004/0049744 A1* | 3/2004 | Sherstyuk | G06F 17/5063 |
| | | | 716/111 |
| 2007/0022100 A1 | 1/2007 | Kitsuregawa et al. | |
| 2007/0174248 A1 | 7/2007 | Kumugai et al. | |
| 2008/0082644 A1* | 4/2008 | Isard | H04L 67/1097 |
| | | | 709/223 |
| 2009/0037425 A1* | 2/2009 | Erickson | G06F 9/44505 |
| 2009/0106278 A1* | 4/2009 | Ramacher | G06F 11/0748 |
| 2011/0225533 A1 | 9/2011 | Kuno et al. | |
| 2013/0103670 A1* | 4/2013 | Kashyap | G06F 17/30445 |
| | | | 707/714 |
| 2014/0351187 A1* | 11/2014 | Halim | G01K 17/00 |
| | | | 706/21 |

OTHER PUBLICATIONS

H. Idei, "Performance Model of Prefetch Technology Using Query Plan on Multiplex Query Execution", The Institute of Electronics, Information and Communication Engineers Dai 18 Kai Data Engineering Workshop Ronbunshu, Jun. 1, 2007.

* cited by examiner

Fig. 2A

| Object ID | Object name | Type | Data volume | Number of rows | File ID |
|---|---|---|---|---|---|
| T1 | Table1 | Table | 800GB | 8G | FILE1 |
| T2 | Table2 | Table | 500GB | 5G | FILE2 |
| : | : | : | : | : | : |

Schema information 122

Fig. 2B

| File-ID | Device name |
|---|---|
| FILE1 | /dev/sdd1 |
| FILE2 | /dev/sde1 |
| : | : |

DB file information 124

Fig. 2C

| Sequential I/O performance | 1ms | ~220 |
|---|---|---|
| Random I/O performance | 10ms | ~222 |
| Number of key value selected rows | I2.C3=10 100,000 | ~224 |
| Number of key value selected rows | I1.C2=max(C2) 100 | ~226 |
| : | : | |

DB statistics information 126

Fig. 2D

| QID (230) | SubQID (232) | ScanID (234) | Scan type (236) | Access destination object ID (238) | Index key (240) | Key value (242) |
|---|---|---|---|---|---|---|
| Q1 | B | 1 | IndexScan | T2.I2 | I2.C3 | C3=10 |
| Q1 | A | 2 | IndexScan | T1.I1 | I1.C2 | C2=Max(C2) |
| : | : | : | : | : | : | : |

Query plan information

Fig. 2E

| Entry No (250) | Time Stamp (252) | Thread ID (254) | Event Type (256) | Task ID (258) | Parent Task ID (260) | QID (262) | Sub QID (264) | Object ID (266) | File ID (268) | Page ID (270) | size (272) | IO-ID (274) |
|---|---|---|---|---|---|---|---|---|---|---|---|---|
| 1 | 100.12 | Thr1 | Task Start | Task1 | Task0 | Q1 | A | - | - | - | - | - |
| 2 | 100.13 | Thr1 | IO-Submit | Task1 | - | Q1 | A | O1 | FILE1 | P101 | 4096 | IO1 |
| 3 | 105.30 | Thr1 | IO-GetEvent | Task1 | - | Q1 | A | O1 | - | - | - | IO1 |
| 4 | 105.31 | Thr1 | OP Start | Task1 | - | Q1 | A | O1 | - | - | - | - |
| 5 | 105.33 | Thr1 | OP End | Task1 | - | Q1 | A | O1 | - | - | - | - |
| 6 | 105.34 | Thr1 | Task Start | Task2 | Task1 | Q1 | A | - | - | - | - | - |
| 7 | 105.34 | Thr2 | Task Start | Task16 | Task1 | Q1 | A | - | - | - | - | - |
| 8 | 105.35 | Thr1 | IO-Submit | Task2 | - | Q1 | A | O1 | FILE1 | P102 | 4096 | IO2 |
| 9 | 105.36 | Thr2 | IO-Submit | Task16 | - | Q1 | A | O1 | FILE1 | P103 | 4096 | IO3 |
| 10 | 109.79 | Thr1 | IO-GetEvent | Task2 | - | Q1 | A | O1 | - | - | - | IO2 |
| : | : | : | : | : | : | : | : | : | : | : | : | : |

DB processing information

Fig. 3A

| Device name | ST-ID | LUN |
|---|---|---|
| /dev/sdd1 | ST1 | Lun1 |
| /dev/sde1 | ST1 | Lun2 |
| : | : | : |

OS mapping information 114

Fig. 3B

| Entry No | Time Stamp | Event Type | IO-ID | ST-ID | LUN | LBA | Size |
|---|---|---|---|---|---|---|---|
| 1 | 100.13 | IO-Submit Recv | IO1 | - | - | - | - |
| 2 | 100.14 | IO-Request | IO1 | ST1 | Lun1 | 0x01004000 | 4096 |
| 3 | 105.29 | IO-Comp Recv | IO1 | - | - | - | - |
| 4 | 105.36 | IO-Submit Recv | IO2 | - | - | - | - |
| 5 | 105.37 | IO-Submit Recv | IO3 | - | - | - | - |
| 6 | 105.38 | IO-Request | IO2 | ST1 | Lun1 | 0x01005000 | 4096 |
| 7 | 105.39 | IO-Request | IO3 | ST1 | Lun1 | 0x01006000 | 4096 |
| 8 | 109.78 | IO-Comp Recv | IO2 | - | - | - | - |
| : | : | : | : | : | : | : | : |

OS processing information 116

Fig. 4A

| ST-ID | LUN | Number of HDDs | HDD-ID |
|---|---|---|---|
| ST1 | Lun1 | 10 | HDD1, HDD2, HDD3, ... |
| ST1 | Lun2 | 10 | HDD51, HDD52, HDD53, ... |
| : | : | : | : |

ST mapping information 172

Fig. 4B

| Entry No | Time Stamp | Event Type | IO-ID | Size | LUN | LBA | HDD-ID | PBA |
|---|---|---|---|---|---|---|---|---|
| 1 | 100.21 | IO-Req Recv | IO1 | 4096 | Lun1 | 0x01004000 | - | - |
| 2 | 100.26 | Disk-IO Start | IO1 | 4096 | - | - | HDD1 | 0x00008000 |
| 3 | 105.12 | Disk-IO End | IO1 | - | - | - | - | - |
| 4 | 105.18 | IO-Comp Send | IO1 | - | - | - | - | - |
| 5 | 105.44 | IO-Req Recv | IO2 | 4096 | Lun1 | 0x01005000 | - | - |
| 6 | 105.46 | IO-Req Recv | IO3 | 4096 | Lun1 | 0x01006000 | - | - |
| 7 | 105.50 | Disk-IO Start | IO2 | 4096 | - | - | HDD2 | 0x0000A000 |
| 8 | 105.52 | Disk-IO Start | IO3 | 4096 | - | - | HDD3 | 0x0000C000 |
| 9 | 109.61 | Disk-IO End | IO2 | - | - | - | - | - |
| 10 | 109.68 | IO-Comp Send | IO2 | - | - | - | - | - |
| : | : | : | : | : | : | : | : | : |

ST processing information 174

Fig. 5A

| Number of kernel threads | 64 | ~500 |
| --- | --- | --- |
| Number of tasks per kernel thread | 1,000 | ~502 |
| Number of HBA ports | 6 | ~504 |
| Number of simultaneous I/O processing per HBA port | 256 | ~506 |
| Network bandwidth | 4Gbps | ~508 |
| Number of storage controllers | 2 | ~510 |
| Number of simultaneous I/O processing per storage controller | 1,000 | ~512 |
| Number of HDDs | 32 | ~514 |
| Number of simultaneous I/O processing per HDD (Number of tag) | 30 | ~516 |
| : | : | |

System information 196

Fig. 5B

Select C1 From T1
　Where C2=(Select MAX(C2) From T2 Where C3=10)　　~520

Example of query (SQL)

Fig. 5C

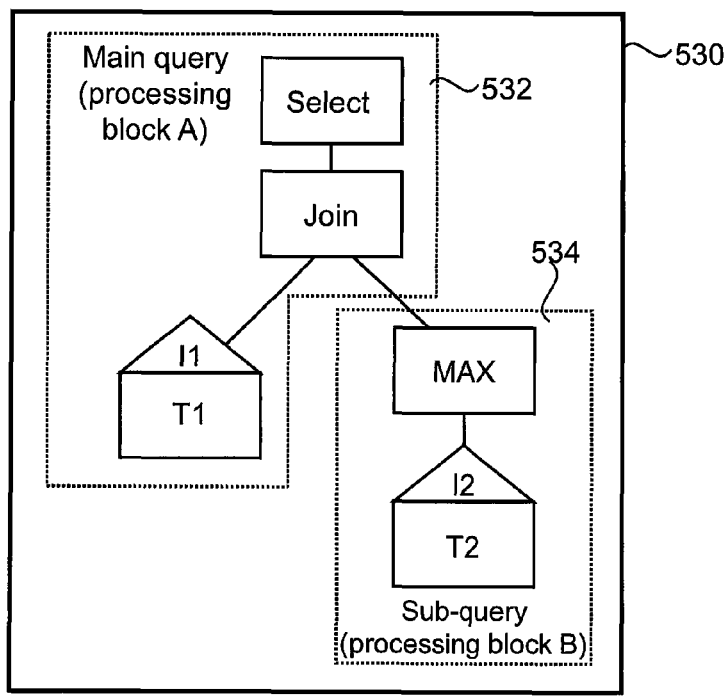

Query plan

Fig. 12A
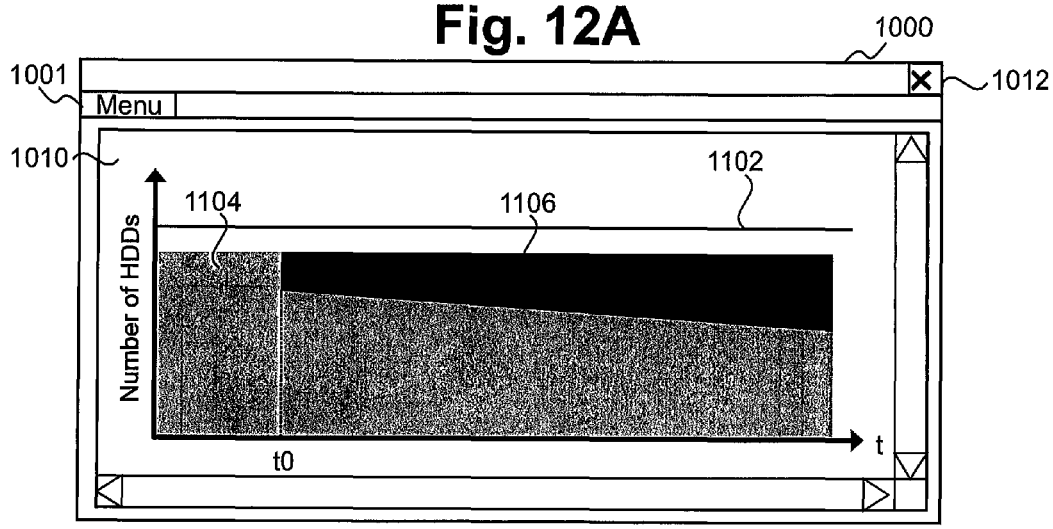
Fig. 12B
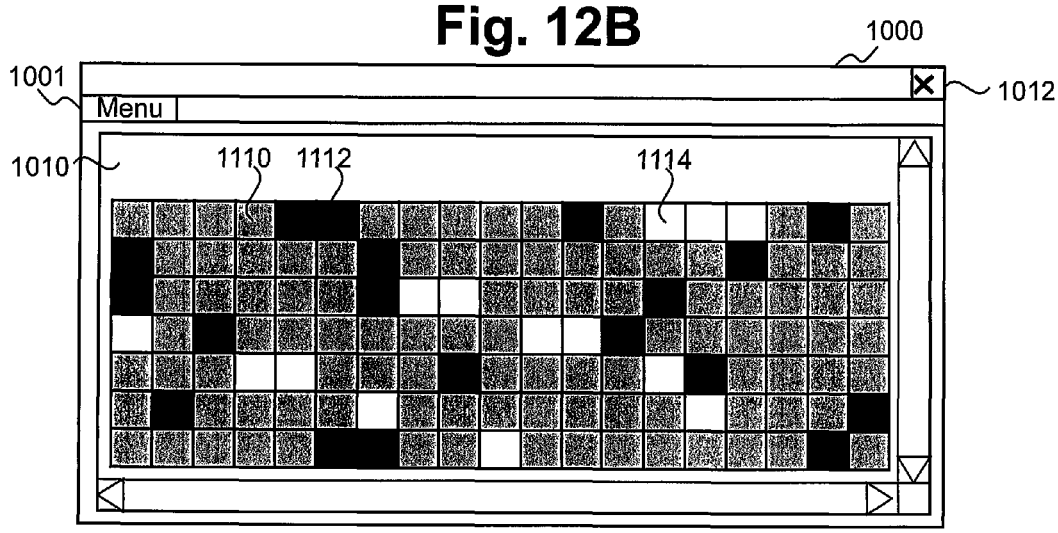
Fig. 12C
| Runk | ST-ID / HDD-ID | Non-conformity ratio [%] | |
|---|---|---|---|
| No.1 | ST1 / HDD45 | 32.5% | Display detail |
| No.2 | ST1 / HDD6 | 31.8% | Display detail |
| No.3 | ST1 / HDD74 | 31.4% | Display detail |
| : | : | : | : |

Logical volume information 1500

Volume group information 1510

```
SELECT A.A2, SUM(B.B2)
FROM A JOIN B ON A.A3=B.B1
WHERE A.A2 LIKE 'A%'
GROUP BY A.A2
ORDER BY SUM(B.B2) DESC
```

| A.A2 | SUM |
|------|------|
| AAA | 2725 |
| ABB | 90 |

Fig. 20

| Page ID | Object ID | Parent Page ID | Key Range | ... |
|---------|-----------|----------------|-----------|-----|
| P101 | Index IA | - | [AAA, DDD] | |
| P102 | Index IA | P101 | [AAA, AAA] | |
| P103 | Index IA | P101 | [ABB, BBB] | |
| P104 | Index IA | P101 | [CCC, DDD] | |
| P105 | Table A | - | - | |
| P106 | Table A | - | - | |
| P107 | Table A | - | - | |
| P201 | Index IB | - | [2, 31] | |
| P202 | Index IB | P201 | [2, 12] | |
| P203 | Index IB | P201 | [17, 21] | |
| P204 | Index IB | P201 | [22, 31] | |
| P205 | Table B | - | [2, 12] | |
| P206 | Table B | - | [12, 18] | |
| P207 | Table B | - | [21, 22] | |
| P208 | Table B | - | [25, 31] | |
| ... | | ... | ... | ... |

Data structure summary table 2000

Fig. 22

| Entry No. | Time Stamp | Thread ID | Event Type | Task ID | ... | Page ID | Parent Task ID | ... |
|---|---|---|---|---|---|---|---|---|
| 1 | 100.12 | Thr1 | Task Start | Task1 | | | Task0 | |
| 2 | 100.13 | Thr1 | IO-Submit | Task1 | | P101 | - | |
| 3 | 102.32 | Thr1 | IO-GetEvent | Task1 | | P101 | - | |
| 4 | 102.32 | Thr1 | OP Start | Task1 | | P101 | - | |
| 5 | 102.33 | Thr1 | OP End | Task1 | | P101 | - | |
| 6 | 102.33 | Thr1 | Task Start | Task2 | | | Task1 | |
| 7 | 102.34 | Thr1 | IO-Submit | Task2 | | P102 | - | |
| 8 | 103.78 | Thr1 | IO-GetEvent | Task2 | | P102 | - | |
| 9 | 103.78 | Thr1 | OP Start | Task2 | | P102 | - | |
| 10 | 103.79 | Thr1 | OP End | Task2 | | P102 | - | |
| 11 | 103.79 | Thr1 | Task Start | Task3 | | | Task2 | |
| 12 | 103.80 | Thr1 | IO-Submit | Task3 | | P105 | - | |
| 13 | 105.32 | Thr1 | IO-GetEvent | Task3 | | P105 | - | |
| 14 | 105.32 | Thr1 | OP Start | Task3 | | P105 | - | |
| 15 | 105.33 | Thr1 | OP End | Task3 | | P105 | - | |
| 16 | 105.33 | Thr1 | Task Start | Task4 | | | Task3 | |
| ... | ... | ... | ... | ... | ... | ... | ... | ... |

DB processing information 2200

Fig. 24

| Entry No. | Time Stamp | Thread ID | Event Type | Task ID | ... | Page ID | Parent Task ID | ... |
|---|---|---|---|---|---|---|---|---|
| 1 | 100.12 | Thr1 | Task Start | Task1 | | | Task0 | |
| 2 | 100.13 | Thr1 | IO-Submit | Task1 | | P101 | - | |
| 3 | 102.32 | Thr1 | IO-GetEvent | Task1 | | P101 | - | |
| 4 | 102.32 | Thr1 | OP Start | Task1 | | P101 | - | |
| 5 | 102.33 | Thr1 | OP End | Task1 | | P101 | - | |
| 6 | 102.33 | Thr1 | Task Start | Task2 | | | Task1 | |
| 7 | 102.33 | Thr1 | Task Start | Task16 | | | Task16 | |
| 8 | 102.34 | Thr1 | IO-Submit | Task2 | | P102 | - | |
| 9 | 102.35 | Thr1 | IO-Submit | Task16 | | P103 | - | |
| 10 | 103.65 | Thr1 | IO-GetEvent | Task16 | | P103 | - | |
| 11 | 103.65 | Thr1 | OP Start | Task16 | | P103 | - | |
| 12 | 103.66 | Thr1 | OP End | Task16 | | P103 | - | |
| 13 | 103.66 | Thr1 | Task Start | Task17 | | P105 | Task16 | |
| 14 | 103.67 | Thr1 | Task Start | Task21 | | P106 | Task16 | |
| 15 | 103.78 | Thr1 | IO-GetEvent | Task2 | | P102 | - | |
| 16 | 103.78 | Thr1 | OP Start | Task2 | | P102 | - | |
| ... | ... | ... | ... | ... | ... | ... | ... | ... |

DB processing information 2400

Fig. 27
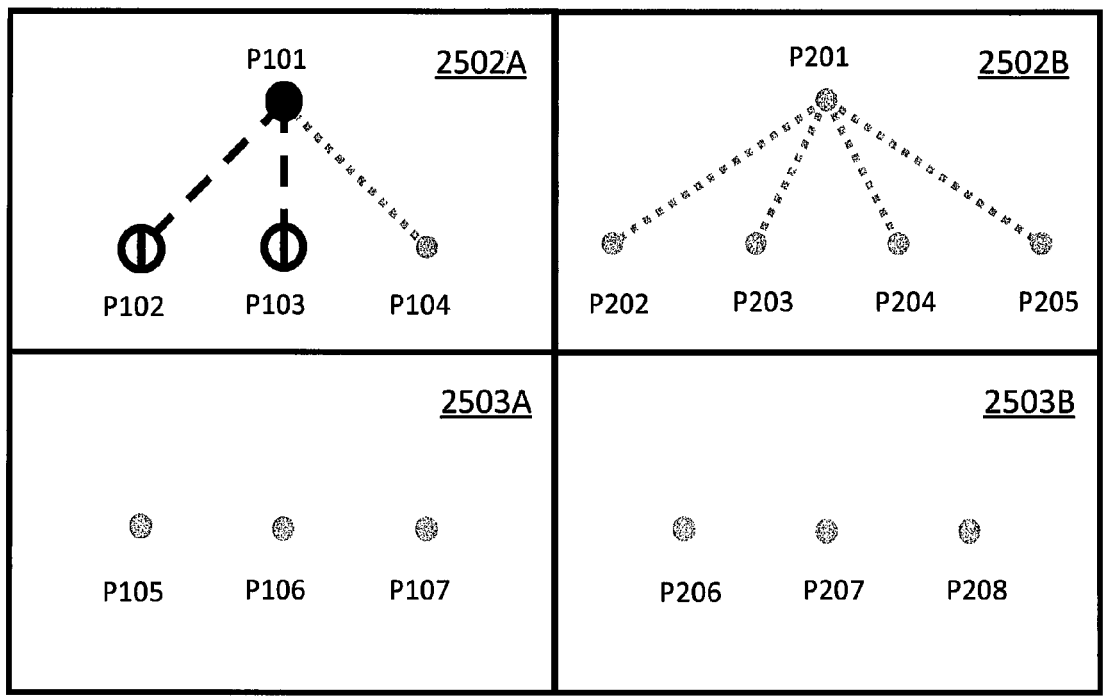
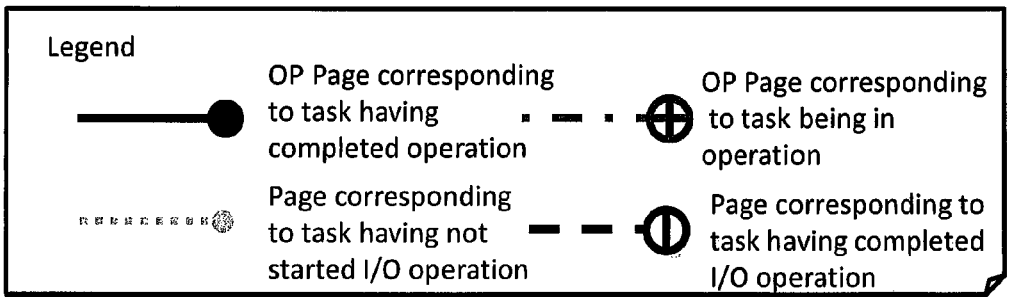

Fig. 29
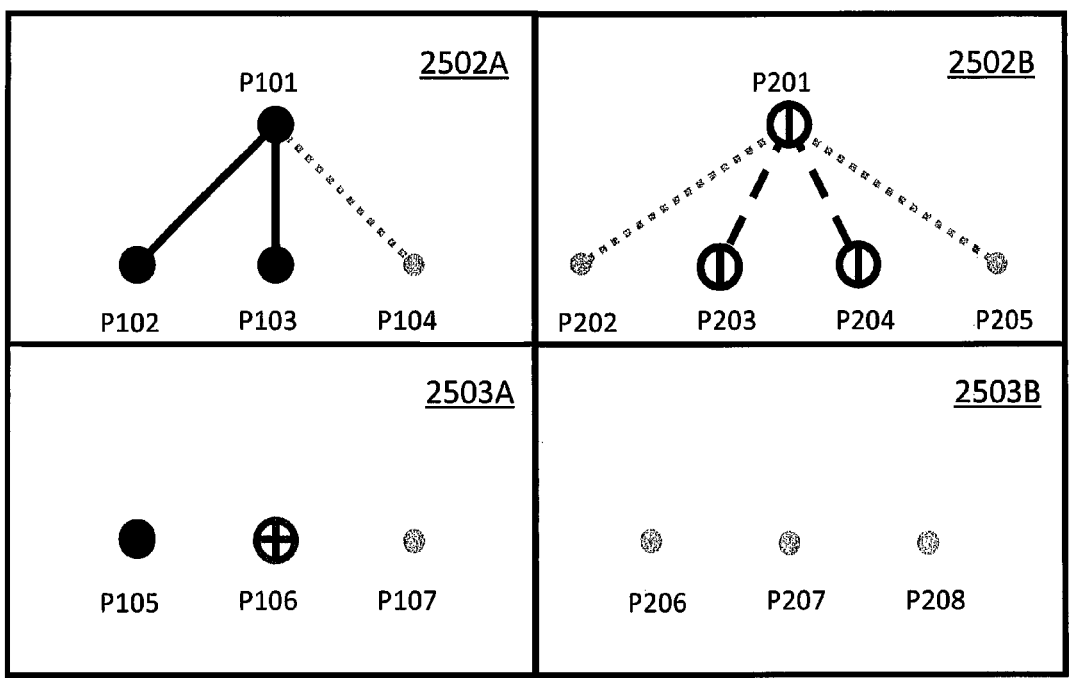
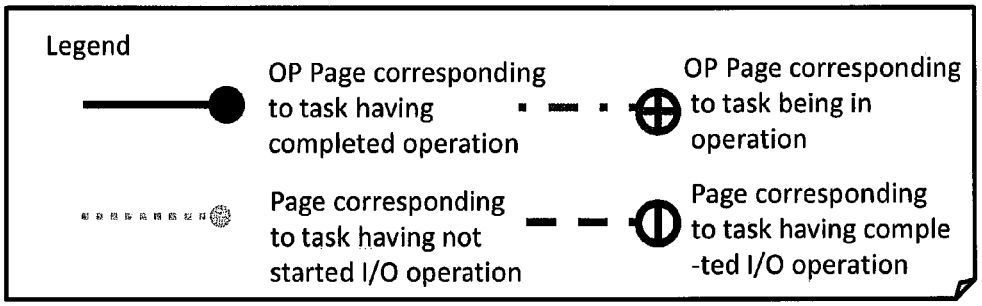

2501

Legend

— ● OP Task having completed operation

· — · ⊕ OP Task being in Operation

······● Task having not started

— — ⊖ IO Task being in I/O operation

ANALYSIS SYSTEM, COMPUTER SYSTEM, AND ANALYSIS METHOD FOR ANALYZING BEHAVIOR OF DATABASE MANAGEMENT SYSTEM

TECHNICAL FIELD

The present invention relates to a technique of analyzing the behavior, the performance, and the like of a database (DB).

BACKGROUND ART

Currently, many applications based on DBs are present, and a DBMS that performs a series of processing and managements relating to DBs has become very important. One of the features of the DBMS is to deal with a large amount of data. Thus, in many computer systems in which the DBMS operates, a form of system in which a storage device having a large-capacity disk is coupled to a computer in which the DBMS operates, and DB data is stored in the storage device is typical.

When this form of system is adopted, since data is stored on the disk of the storage device, an access to the disk occurs inevitably when performing processing (DB processing) on DBs. In particular, in very large scale DBs of petabyte class, a processing of finding certain specific data from the DB data incurs an enormous amount of time. Thus, a technique disclosed in PTL 1 is known as a technique of accelerating a retrieving processing of finding specific data among a large amount of data.

The technique disclosed in PTL 1 is a technique for multiplexing reading of data, by dynamically creating a task whenever reading data and executing the tasks in parallel. According to a DBMS which uses this technique, it is possible to improve retrieving performance dramatically as compared to a conventional DBMS that executes tasks in their occurrence order.

The DBMS divides a DB processing into processing units called tasks, executes the tasks in a highly parallel manner to submit I/Os (asynchronous I/Os) in a highly multiplexed manner to maximize storage performance to thereby improve the performance. Thus, the degree of parallelism of processing (tasks) including I/Os is very important in improving the performance. For example, the ability to submit how many I/Os to each HDD of a storage device, that is, the ability to accumulate how many tags (SCSI commands submitted from a computer to a storage device) in each HDD is important.

CITATION LIST

Patent Literature

[PTL 1]
Japanese Patent Application Publication No. 2007-34414

SUMMARY OF INVENTION

Technical Problem

In a DBMS that executes processing (tasks) in a highly parallel manner and submits I/Os in a highly multiplexed manner, the processing behavior is very complex, and the analysis of the behavior and performance for operation debugging during development or performance debugging during system operation incurs an enormous amount of time.

The present invention has been made in view of the problems, and an object thereof is to provide a technique of easily and appropriately analyzing the behavior, the performance, and the like of a DBMS that executes tasks in parallel.

Solution to Problem

In a DBMS that executes tasks in parallel, the degree of processing parallelism which is the number of tasks executed in parallel is very important in improving the performance, and this degree of processing parallelism is determined by the content of queries, hardware resources, and the like. In order to achieve the object, the present invention aims to facilitate the analysis of the behavior and performance of the DBMS by focusing on the degree of processing parallelism.

An analysis system according to an aspect of the present invention analyzes the behavior of a computer system in DB processing of a DBMS. The computer system includes a storage device and a computer. The storage device includes a plurality of storage media that stores DB data. The DBMS operates on a computer that has a processor core and can send a plurality of data read requests for executing a query to the DB to the storage device. The DBMS may dynamically generate tasks for executing operations and execute the tasks generated dynamically during processing of the query. Specifically, during processing the query, for example, the DBMS may perform (a) generating a task for executing an operation, (b) executing the generated task, (c) generating a new task based on an execution result of an N-th (N is an integer of 1 or more) operation corresponding to the task executed in (b) when an (N+1)-th operation is executed based on the execution result of the N-th operation, and (d) performing (b) and (c) on the new generated task. In (b) and (d), when two or more executable tasks are present, the DBMS may execute at least two tasks among the two or more tasks in parallel. In execution of tasks, a thread (processing) managed by an OS may be used, a plurality of threads executed by a processor core may be executed, and respective threads may execute a plurality of tasks. The DBMS may perform operations according to the manner described in PTL 1.

The analysis system includes a storage resource capable of storing information and a processor executing processing.

The storage resource stores thread number specifying information capable of specifying a largest number of threads for the query in the DBMS, first processing number specifying information capable of specifying a first number of I/O processing that an interface between the computer and the storage device can execute in parallel, second processing number specifying information capable of specifying a second number of I/O processing that can be executed in parallel in the storage medium of the storage device, and third processing number specifying information capable of specifying a third number of I/O processing that each storage medium can execute in parallel.

The processor acquires a number of selected rows corresponding to a key value of an index key for a query from the DBMS and calculates a model-based predicted degree of processing parallelism which is a degree of processing parallelism predicted based on a model of the processing corresponding to the query, based on the number of selected rows, the largest number of threads specified by the thread number specifying information, the first number of I/O processing specified by the first processing number specifying information, the second number of I/O processing specified by the second processing number specifying information, and the third number of I/O processing specified by the third processing number specifying information. The processor acquires, from the storage device, event information on an input-output event with respect to the storage medium when the processing corresponding to the query is executed actually; calculates a measured degree of processing parallelism which is a degree of processing parallelism when the processing corresponding to the query is executed actually, based on the event information; and performs control of displaying information based on the model-based predicted degree of processing parallelism and the measured degree of processing parallelism.

Advantageous Effects of Invention

According to the analysis system of the present invention, it is possible to easily and appropriately analyze the behavior, the performance, and the like of a DBMS that executes tasks in parallel.

BRIEF DESCRIPTION OF DRAWINGS

FIG. 2A is a block diagram of an example of schema information according to Embodiment 1.

FIG. 2B is a block diagram of an example of DB file information according to Embodiment 1.

FIG. 2C is a block diagram of an example of DB statistics information according to Embodiment 1.

FIG. 2D is a block diagram of an example of query plan information according to Embodiment 1.

FIG. 2E is a block diagram of an example of DB processing information according to Embodiment 1.

FIG. 3A is a block diagram of an example of OS mapping information according to Embodiment 1.

FIG. 3B is a block diagram of an example of OS processing information according to Embodiment 1.

FIG. 4A is a block diagram of an example of ST mapping information according to Embodiment 1.

FIG. 4B is a block diagram of an example of ST processing information according to Embodiment 1.

FIG. 5A is a block diagram of an example of system information according to Embodiment 1.

FIG. 5B is a diagram illustrating an example of a query (SQL) according to Embodiment 1.

FIG. 5C is a diagram illustrating an example of a query plan according to Embodiment 1.

FIG. 12A is a diagram illustrating a screen display example including the graph illustrating conformity and non-conformity between a model-based predicted value and a measured value of the degree of processing parallelism of an HDD according to Embodiment 1.

FIG. 12B is a diagram illustrating conformity and non-conformity between a model-based predicted value and a measured value of the degree of processing parallelism of each HDD according to Embodiment 1.

FIG. 12C is a diagram illustrating a screen display example illustrating HDDs in descending order of non-conformity ratio between a model-based predicted value and a measured value of the degree of processing parallelism according to Embodiment 1.

FIG. 20 illustrates an example of a data structure summary table according to Embodiment 2.

FIG. 22 illustrates an example of DB processing information of a conventional DBMS.

FIG. 24 illustrates an example of DB processing information of the DBMS according to Embodiment 2.

FIG. 27 illustrates an example of a data structure behavior visualization tree according to Embodiment 2.

FIG. 29 illustrates an example of a data structure visualization tree when a designated time is changed.

DESCRIPTION OF EMBODIMENTS

Hereinafter, several embodiments of the present invention will be described with reference to the drawings. The embodiments described below are not intended to limit the inventions according to the claims, and all elements and combinations thereof described in the embodiments are not necessarily essential to the solving means for the invention.

In the following description, there may be cases where processing is described using a "program" as the subject. However, since the processing is performed while using a storage resource (for example, a memory) and/or a communication interface device (for example, a communication port) as necessary when a program is executed by a processor (for example, a central processing unit (CPU)) included in a computer, a storage apparatus, or the like, the processor may also be used as the subject of the processing. Processing described using the program as the subject may be processing performed by the processor or a device (a computer, a storage apparatus, or the like) having the processor. Moreover, a controller may be the processor itself and may include a hardware circuit that performs a part or all of the processing performed by the processor. A program may be installed in respective controllers from a program source. The program source may be a program distribution computer or a storage medium, for example.

Moreover, a serial interface or an Ethernet interface (Ethernet is a registered trademark) interface may be used as an input-output device of a computer, a display device having a display, a keyboard, or a pointer device may be coupled to the interface, and display information may be sent to the display device and input information may be received from the display device. In this way, the operation of the input-output device inputting and displaying data may be replaced with the operation of the display device displaying and inputting data.

In the following description, a set of one or more computers that analyze various items of information in a computer system is sometimes referred to as an analysis system. When a computer displays the display information, the computer is an analysis system. Moreover, a combination of the computer and the display device is an analysis system. Moreover, a plurality of computers may perform the analyzing and displaying processing in order to improve the speed and the reliability of the analyzing processing. In this case, the plurality of computers (including the display device when the display device displays data) is the analysis system.

Embodiment 1

Figure 1:
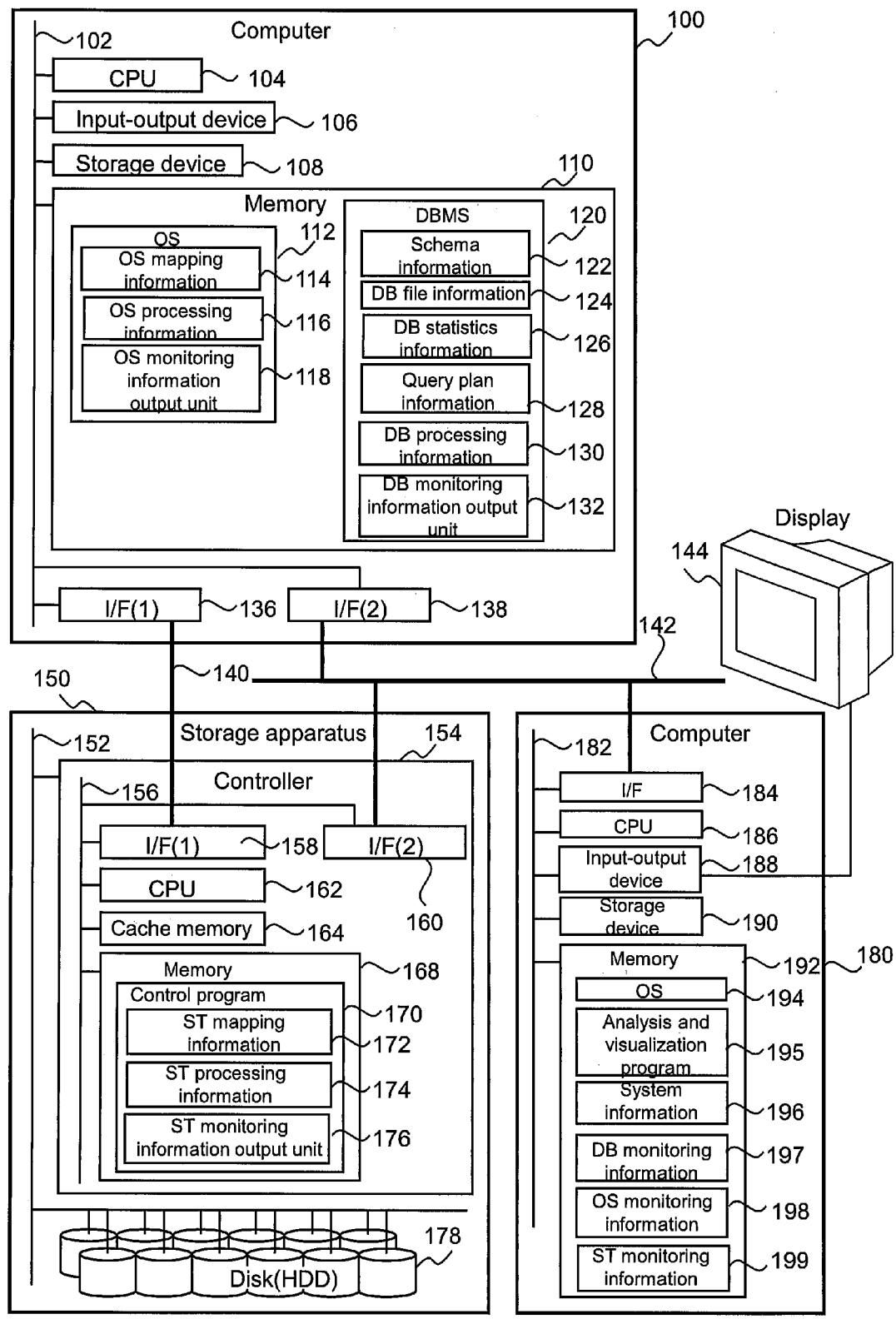
FIG. 1 is a block diagram of an example of a computer system according to Embodiment 1.

FIG. 1 is a block diagram of an example of a computer system according to Embodiment 1.

A computer system includes a computer 100, a storage apparatus 150 as an example of a storage device, and a computer 180 as an example of an analysis system. In FIG. 1, only one computer 100 and one storage apparatus 150 are illustrated, a plurality of computers and a plurality of storage apparatuses may be provided. The computer 100 and the storage apparatus 150 are connected via a communication network 140. The storage apparatus 150 stores DB data. The computer 100 manages the DB data stored in the storage apparatus 150. Hereinafter, although a person who operates the computer 100 is referred to as a "system administrator" for the convenience's sake, the computer 100 may be operated by a person other than the system administrator.

The computer 100, the storage apparatus 150, and the computer 180 are connected via a communication network 142. The computer 180 acquires various items of monitoring information from the computer 100 and the storage apparatus 150 and performs an analysis and visualization processing using the monitoring information. The communication networks 140 and 142 may be a network such as a local area network (LAN) or a wide area network (WAN) and may be a network (storage area network: SAN) that include fiber channels or the like.

The computer 100 can be realized by a general computer, for example. For example, the computer 100 includes a control processor (CPU) 104, an input-output device 106, a storage device 108, a memory 110, an I/F(1) 136, and an I/F(2) 138. The CPU 104, the input-output device 106, the storage device 108, the memory 110, the I/F(1) 136, and the I/F(2) 138 are connected via an internal bus 102.

The I/F(1) 136 is an interface to the communication network 140, and the I/F(2) 138 is an interface to the communication network 142. The I/F(1) 136 is a host bust adapter (HBA), for example. The HBA includes one or more ports. The input-output device 106 includes an input device such as a mouse or a keyboard and an output device such as a liquid crystal display, for example. The storage device 108 stores programs executed by the CPU 104 and information and the like required by the CPU 104.

The memory 110 stores programs executed by the CPU 104 and information and the like required by the CPU 104. For example, the memory 110 stores an operating system (hereinafter OS) 112 and a DBMS 120. The OS 112 stores OS mapping information 114 that correlates a device managed by the OS 112 and a logical storage area on the storage apparatus 150 and OS processing information 116 on a processing (processing event) in the OS when the DBMS 120 executes a query. Moreover, the OS 112 includes a program for constructing an OS monitoring information output unit 118 that outputs the OS mapping information 114 and the OS processing information 116 to an external device. The OS monitoring information output unit 118 is constructed when the CPU 104 executes the program. When outputting monitoring information to the computer 180, the OS monitoring information output unit 118 may write the monitoring information into a file and then send the file to the computer 180 and may send the monitoring information directly to the computer 180.

The DBMS 120 stores schema information 122 on a schema (hereinafter referred to as an object) such as a table or an index of DBs, DB file information 124 on a file in which the DB data is stored, DB statistics information 126 on the statistics inside the DBMS 120, query plan information 128 on queries executed by the DBMS 120, and DB processing information 130 on processing when the DBMS 120 executes a query. Moreover, the DBMS 120 includes a program for constructing a DB monitoring information output unit 132 that outputs the respective items of information to an external device. The DB monitoring information output unit 132 is constructed when the CPU 104 executes the program. When outputting monitoring information to the computer 180, the DB monitoring information output unit 132 may write the monitoring information into a file and then send the file to the computer 180 and may send the monitoring information directly to the computer 180.

The CPU 104 executes various processing by executing the program stored in the memory 110. For example, the CPU 104 receives queries from an application (not illustrated), creates a query plan of the received queries, and executes processing according to the query plan by executing the DBMS 120. Moreover, when it is necessary to access the DB data stored in the storage apparatus 150 during the processing, the CPU 104 submits an access request (I/O request) for the data to the storage apparatus 150 via the OS 112.

In FIG. 1, although an example in which both the OS 112 and the DBMS 120 are stored in the memory 110 is illustrated, at least part of the OS 112 and the DBMS 120 may be stored in the storage device 108.

The storage apparatus 150 includes a controller 154 and a plurality of disks (HDDs) 178 as a storage medium. The controller 154 and the plurality of disks 178 are connected by an internal bus 152. The disk 178 is a hard disk drive (HDD, magnetic storage device), for example. In the storage apparatus 150, the plurality of disks 178 may be formed of a redundant array of independent (or inexpensive) disks (RAID). Moreover, the storage apparatus 150 may include a storage device (for example, a flash memory drive) having other types of storage media in addition to the disk 178 or instead of the disk 178.

The cross-section 154 includes an I/F(1) 158, an I/F(2) 160, a CPU (control processor) 162, a cache memory 164, and a memory 168. The I/F(1) 158, I/F(2) 160, the CPU 162, the cache memory 164, and the memory 168 are connected by an internal bus 156, for example. The I/F(1) 158 is an interface to the communication network 140, and the I/F(2) 160 is an interface to the communication network 142. The cache memory 164 stores necessary data.

The memory 168 stores programs executed by the CPU 162 and information and the like required by the CPU 162. The memory 168 stores a control program 170 that controls the storage apparatus 150. The control program 170 stores ST mapping information 172 that correlates a logical storage area (LU: logical unit) of the storage apparatus 150 with a physical storage area of the disk 178 and ST processing information 174 on a processing (processing event) in the storage apparatus 150 when the DBMS 120 executes a query. The control program 170 includes a program for constructing a ST monitoring information output unit 176 that outputs the respective items of information to an external device. The ST monitoring information output unit 176 is constructed when the CPU 162 executes the program. When sending the ST processing information 174 to the computer 180, the ST monitoring information output unit 176 may write the ST processing information into a file and then send the same at once to the computer 180 when a query ends and may send the ST processing information directly to the computer 180 when an entry is added to the ST processing information 174. The CPU 162 executes various processing by executing the program stored in the memory 168.

The computer 180 can be realized by a general computer, for example. For example, the computer 180 includes an I/F 184, a CPU (control processor) 186, an input-output device 188, a storage device 190, and a memory 192. The I/F 184, the CPU 186, the input-output device 188, the storage device 190, and the memory 192 are connected by an internal bus 182. Here, the storage device 190 and the memory 192 are examples of storage resources.

The I/F 184 is an interface to the communication network 142. The input-output device 188 is coupled to an input device such as a mouse or a keyboard, for example, and a display 144. Various items of information (for example, execution results of the analysis and visualization program 195) are displayed on the display 144. The storage device 190 stores programs executed by the CPU 186 and information and the like required by the CPU 186.

The memory 192 stores programs executed by the CPU 186 and information and the like required by the CPU 186. The memory 192 stores system information 196 which is information on the computer system, DB monitoring information 197 which is a series of items of information output by the DB monitoring information output unit 132, OS monitoring information 198 which is a series of items of information output by the OS monitoring information output unit 118, ST monitoring information 199 which is a series of items of information output by the ST monitoring information output unit 176, and the analysis and visualization program 195. The system information 196 may be given as parameters by a system administrator and may be automatically acquired from the DB monitoring information output unit 132, the OS monitoring information output unit 118, and the ST monitoring information output unit 176. The CPU 186 executes various processing by executing the program stored in the memory 192. For example, the CPU 186 executes processing using the system information 196, various items of monitoring information, and the like stored in the memory 192 by executing the analysis and visualization program 195.

In FIG. 1, although an example in which both the OS 194 and the analysis and visualization program 195 are stored in the memory 192 is illustrated, at least part of the OS 194 and the analysis and visualization program 195 may be stored in the storage device 190.

Next, the details of various items of information described above will be described.

FIG. 2A is a block diagram of an example of schema information stored in the DBMS according to Embodiment 1.

The schema information 122 is information on objects such as tables and indices that construct a DB and has an entry for each object. Each entry includes a field 200 in which an identifier (Object ID) for identifying an object is registered, a field 202 in which the name of an object is registered, a field 204 in which the type (table or index) of an object is registered, a field 206 in which a data volume of an object is registered, a field 208 in which the number of rows of an object (when the type of an object is a table only) is registered, and a field 209 in which an identifier (File-ID) of a DB file in which object data is stored is registered. The schema information 122 is created when a DB is constructed and is updated when an object is added and deleted. FIG. 2B is a block diagram of an example of DB file information stored in the DBMS according to Embodiment 1.

The DB file information 124 is information on a DB file in which DB data is stored and has an entry for each DB file. Each entry includes a field 210 in which an identifier (File-ID) for identifying a DB file is registered and a field 212 in which a device name on an OS 112 on which a DB file is created is registered. The DB file information 124 is created when a DB is constructed and is updated when a DB file is added, deleted, and changed.

FIG. 2C is a block diagram of an example of DB statistics information stored in the DBMS according to Embodiment 1.

The DB statistics information 126 is information on the statistics inside the DBMS 120 and includes a field 220 in which sequential I/O performance is registered, a field 222 in which random I/O performance as an example of I/O time information indicating the time associated with random input and output is registered, and fields 224 and 226 in which the number of selected rows for an index key value is registered. The number of selected rows 224 for an index key value has an entry for each index key value. The DB statistics information 126 is appropriately updated when the DBMS 120 executes DB processing. The information on the number of selected rows for an index key value may be information calculated based on information such as a histogram and may be a parameter that is given directly from an external device. Moreover, the values registered in the sequential I/O performance 220 and the random I/O performance 222 may be the averages of an I/O response time in a latest past predetermined period.

FIG. 2D is a block diagram of an example of query plan information stored in the DBMS according to Embodiment 1.

The query plan information 128 is information on the query executed by the DBMS 120 and has an entry for each scan in the query. Each entry includes a field 230 in which an identifier (QID) for identifying a query is registered, a field 232 in which an identifier (SubQID) for identifying a processing block (partial query) in a query is registered, a field 234 in which an identifier (ScanID) for identifying a scan in a query is registered, a field 236 in which the type of a scan in the query is registered, a field 238 in which an identifier for identifying an object to be accessed by the scan, a field 240 in which an index key serving as a retrieval condition when the scan is an index scan is stored, and a field 242 in which an index key value serving as a retrieval condition is registered. The query plan information 128 is created after the DBMS 120 receives a query, and with this information, it is possible to specify a table and an index that the subject query accesses, a retrieval condition (an index key and a key value), and the order of accesses.

FIG. 2E is a block diagram of an example of DB processing information stored in the DBMS according to Embodiment 1.

The DB processing information 130 is information on processing when the DBMS 120 executes a query, and an entry (event information) is created when a specific event (for example, an asynchronous I/O submit event or an asynchronous I/O reaping event) is executed during processing. Each entry includes a field 250 in which an entry number is registered, a field 252 in which a time stamp indicating the execution time of an event is registered, a field 254 in which an identifier (Thread ID) for identifying a thread that executes an event is registered, a field 256 in which an event type is registered, a field 258 in which an identifier (Task ID) for identifying a task (a task in a thread) that executes the event is registered, a field 260 in which an identifier (Present Task ID) for identifying a source task (parent task) of a task identified from the identifier registered in the field 258 is registered, a field 262 in which an identifier (QID) for identifying a query serving as an execution source of an event is registered, a field 264 in which an identifier (SubQID) for identifying a processing block in a query serving as an execution source of an event is registered, a field 266 in which an identifier (Object ID) for identifying an access destination object is registered, a field 268 in which an identifier (File-ID) for identifying an access destination DB file is registered, a field 270 in which an offset of data to be accessed is registered, a field 272 in which the size of data to be accessed is registered, and a field 274 in which an identifier (IO-ID) for identifying an I/O submitted by the event is registered.

FIG. 3A is a block diagram of an example of OS mapping information according to Embodiment 1.

The OS mapping information 114 is information that correlates a device managed by the OS 112 with the logical storage area (LU) on the storage apparatus 150 and has an entry for each device. Each entry includes a field 300 in which a device name for identifying a device is registered, a field 302 in which an identifier (ST-ID) for identifying the storage apparatus 150 having a storage area (LU) corresponding to the device is registered, and a field 304 in which a number (LUN) for identifying a storage area (LU) corresponding to the device is registered. The OS mapping information 114 is created when a system is constructed and is updated when a system configuration is changed.

FIG. 3B is a block diagram of an example of OS processing information according to Embodiment 1.

The OS processing information 116 is information on processing in an OS when the DBMS 120 executes a query, and an entry (event information) is created when a specific event (for example, reception of an asynchronous I/O, submitting of an I/O request, reception of completion of I/Os, and the like) is executed. Each entry includes a field 310 in which an entry number is registered, a field 312 in which a time stamp indicating an execution time of an event is registered, a field 314 in which an event type is registered, a field 316 in which an identifier (IO-ID) for identifying an I/O corresponding to the event is registered, a field 318 in which an identifier (ST-ID) for identifying the access destination storage apparatus 150 is registered, a field 320 in which a number (LUN) for identifying an access destination logical storage area (LU) is registered, a field 322 in which a logical address (LBA) of data to be accessed is registered, and a field 324 in which the size of data to be accessed is registered.

FIG. 4A is a block diagram of an example of ST mapping information according to Embodiment 1.

The ST mapping information 172 is information that correlates a logical storage area (LU) managed by the storage apparatus 150 with a physical storage area of the disk 178 and has an entry for each LU. Each entry includes a field 400 in which an identifier (ST-ID) for identifying the storage apparatus 150 having the LU is registered, a field 402 in which a number (LUN) for identifying the LU is registered, a field 404 in which the number of disks 178 that construct the LU is registered, and a field 406 in which an identifier (HDD-ID) for identifying the disk 178 that constructs the LU is registered. The ST mapping information 172 is created when a system is constructed and is updated when a system configuration is changed. When one LU is constructed of a plurality of disks 178, a plurality of fields 406 is created in the same entry.

FIG. 4B is a block diagram of an example of ST processing information according to Embodiment 1.

The ST processing information 174 is information on processing in the storage apparatus 150 when the DBMS 120 executes a query, and an entry (event information) is created when a specific event (for example, reception of an I/O request, start of disk I/Os, end of disk I/Os, submitting of I/O requests, and the like) is executed. Each entry includes a field 410 in which an entry number is registered, a field 412 in which a time stamp indicating the execution time of an event is registered, a field 414 in which an event type is registered, a field 416 in which an identifier (IO-ID) for identifying an I/O corresponding to the event is registered, a field 418 in which the size of an I/O request is registered, a field 420 in which a number (LUN) for identifying an access destination logical storage area (LU) is registered, a field 422 in which a logical address (LBA) of data to be accessed is registered, a field 424 in which an identifier (HDD-ID) for identifying the disk 178 in which data to be accessed is stored is registered, and a field 426 in which a physical address (PBA) of data to be accessed is registered.

FIG. 5A is a block diagram of an example of system information according to Embodiment 1.

The system information 196 is information on the computer system and includes a field 500 in which the number of kernel threads that execute DB processing is registered, a field 502 in which the number of tasks per kernel thread that executes DB processing is registered, a field 504 in which the number of host bus adapter (HBA) ports is registered, a field 506 in which the number of simultaneous I/O processing per HBA port is registered, a field 508 in which the bandwidth of the communication network 140 is registered, a field 510 in which the number of controllers 154 of the storage apparatus 150 is registered, a field 512 in which the number of simultaneous I/O processing per storage controller is registered, a field 514 in which the number of disks is registered, and a field 516 in which the number of simultaneous I/O processing (tags) per disk is registered. Here, the number of kernel threads and the number of tasks per kernel thread correspond to thread number specifying information, the number of HBA ports and the number of simultaneous I/O processing per HBA port correspond to first processing number specifying information, the number of controllers 154 and the number of simultaneous I/O processing per storage controller correspond to second processing number specifying information, and the number of simultaneous I/O processing (tags) per disk corresponds to third processing number specifying information.

Next, the processing executed by the analysis and visualization program 195 will be described, and an example of a query (SQL) of the DBMS 120 and a query plan of the queries will be described.

FIG. 5B is a diagram illustrating an example of a query (SQL) according to Embodiment 1. FIG. 5C is a diagram illustrating an example of a query plan according to Embodiment 1.

A query 520 illustrated in FIG. 5B is executed as illustrated in FIG. 5C such that the portion "Select MAX(C2) From T2 Where C3=10" is first executed as a sub-query 534 (processing block B: partial query), and then, using the execution result of the sub-query 534, a main-query 532 (processing block A: partial query) of the portion "Select C1 From T1 Where C2=(sub-query result)" is executed according to a joining method using indices.

It can be understood that a processing corresponding to the query 520 includes two processing blocks of the processing block B corresponding to the sub-query 534 and the processing block A corresponding to the main-query 532.

The CPU 104 that executes the DBMS 120 specifies a query plan based on the query and registers the query plan in the query plan information 128.

Next, the processing of the computer 180 that executes the analysis and visualization program 195 will be described. It is assumed that before execution of the processing, a computer system has been constructed, the DB has been constructed, and the DBMS 120 of the computer 100 has received the query 520 and executed various processing. Thus, the schema information 122, the DB file information 124, the DB statistics information 126, the DB processing information 128, the OS mapping information 114, the OS processing information 116, the ST mapping information 172, the ST processing information 174, and the system information 196 have been created, and information at that time is reflected.

Figure 6:
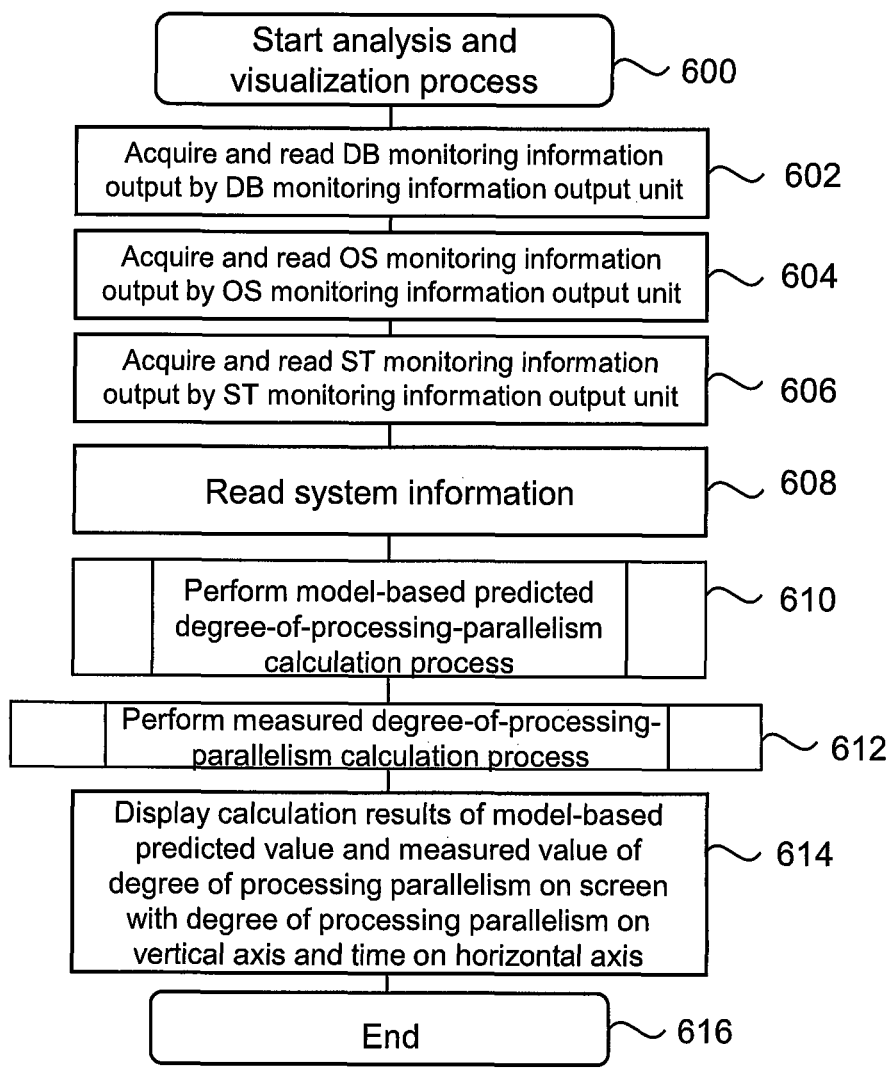
FIG. 6 is a flowchart of an analysis and visualization processing according to Embodiment 1.

FIG. 6 is a flowchart of an analysis and visualization processing according to Embodiment 1. The analysis and visualization processing is a processing realized when the CPU 186 executes the analysis and visualization program 195. Moreover, the degree of processing parallelism which is the number of tasks executed in parallel is determined by the content of a query executed, hardware resources, and the like. In Embodiment 1, the number of tags of the disk 178 of the storage apparatus 150 (hereinafter referred to as the number of HDD tags) is used as a final degree of processing parallelism.

When a system administrator submits an instruction to start the analysis and visualization program 195, the computer 180 starts the analysis and visualization processing (step 600). The processing of the following steps may start automatically when the analysis and visualization program 195 starts and may start according to an instruction of the system administrator.

The analysis and visualization program 195 acquires the monitoring information (the schema information 122, the DB file information 124, the DB statistics information 126, the query plan information 128, and the DB processing information 130) output by the DB monitoring information output unit 132 as DB monitoring information 197 and reads the same into the memory 192 (step 602). Subsequently, the analysis and visualization program 195 acquires the monitoring information (the OS mapping information 114 and the OS processing information 116) output by the OS monitoring information output unit 118 as OS monitoring information 198 and reads the same into the memory 192 (step 604). Subsequently, the analysis and visualization program 195 acquires the monitoring information (the ST mapping information 172 and the ST processing information 174) output by the ST monitoring information output unit 176 as ST monitoring information 199 and reads the same into the memory 192 (step 606). Subsequently, the analysis and visualization program 195 reads the system information 196 from the storage device 190 into the memory 192 (step 608).

Subsequently, the analysis and visualization program 195 executes a model-based predicted degree-of-processing-parallelism calculation processing 700 and calculates a model-based predicted value of the degree of processing parallelism (number of HDD tags) as a value indicating the processing behavior predicted based on a model when the query 520 is executed by the computer system (step 610). Subsequently, the analysis and visualization program 195 executes the measured degree-of-processing-parallelism calculation processing 800 and calculates a measured value of the degree of processing parallelism (number of HDD tags) as a value indicating the actual processing behavior when the query 520 is executed by the computer system (step 612).

Subsequently, the analysis and visualization program 195 displays a graph based on the model-based predicted degree of processing parallelism calculated in step 610 and the measured degree of processing parallelism calculated in step 612 on the display 144 (step 614) and ends the processing according to an instruction of the system administrator (step 616). In Embodiment 1, a graph in which the model-based predicted degree of processing parallelism and the measured degree of processing parallelism are on the vertical axis and the time is on the horizontal axis is displayed on the display 144. According to this graph, it is possible to compare the model-based predicted degree of processing parallelism and the measured degree of processing parallelism easily. Details of the graph will be described later.

Figure 7:
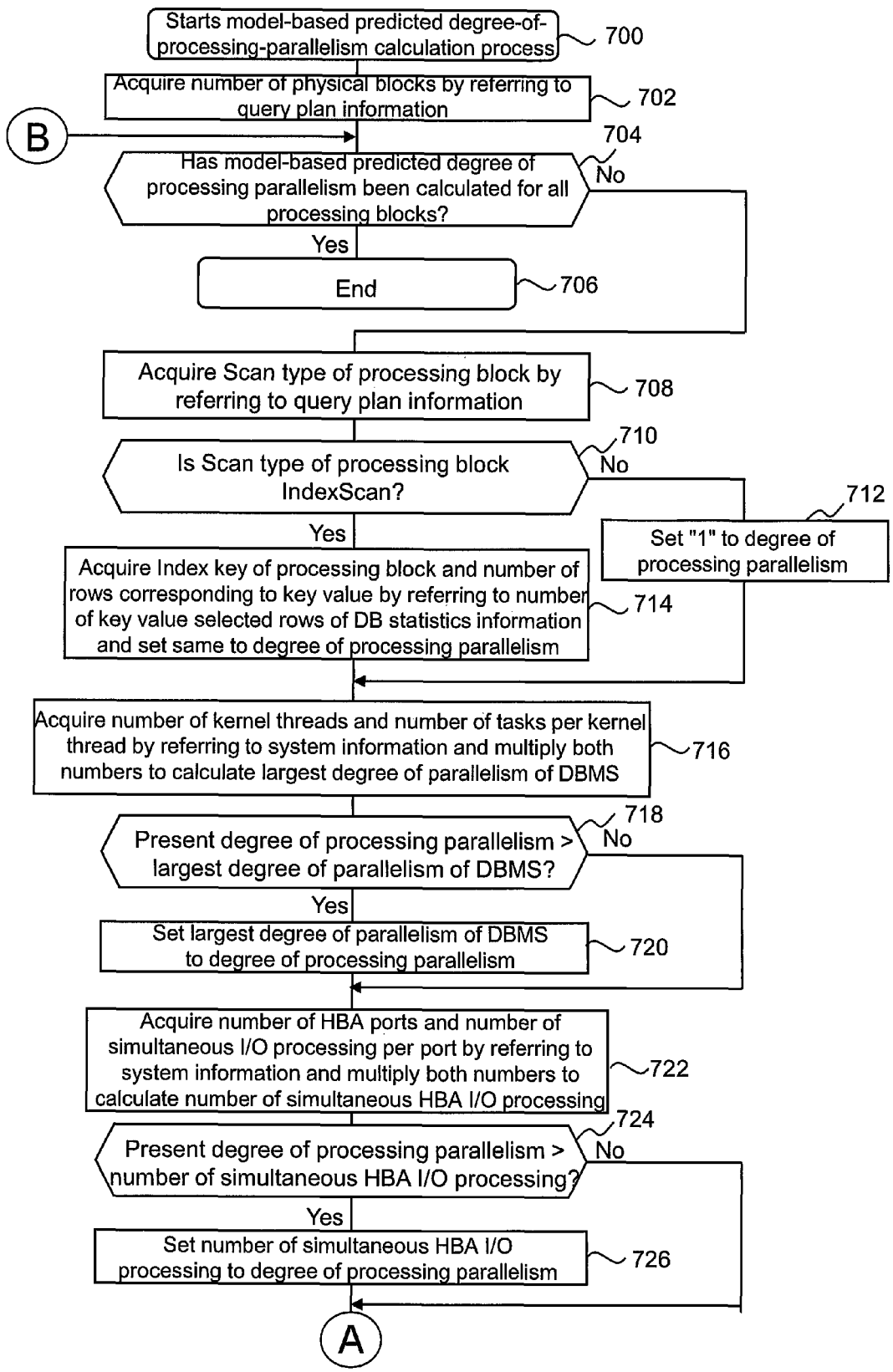
FIG. 7 is a first flowchart of a model-based predicted degree-of-processing-parallelism calculation processing according to Embodiment 1.
Figure 8:
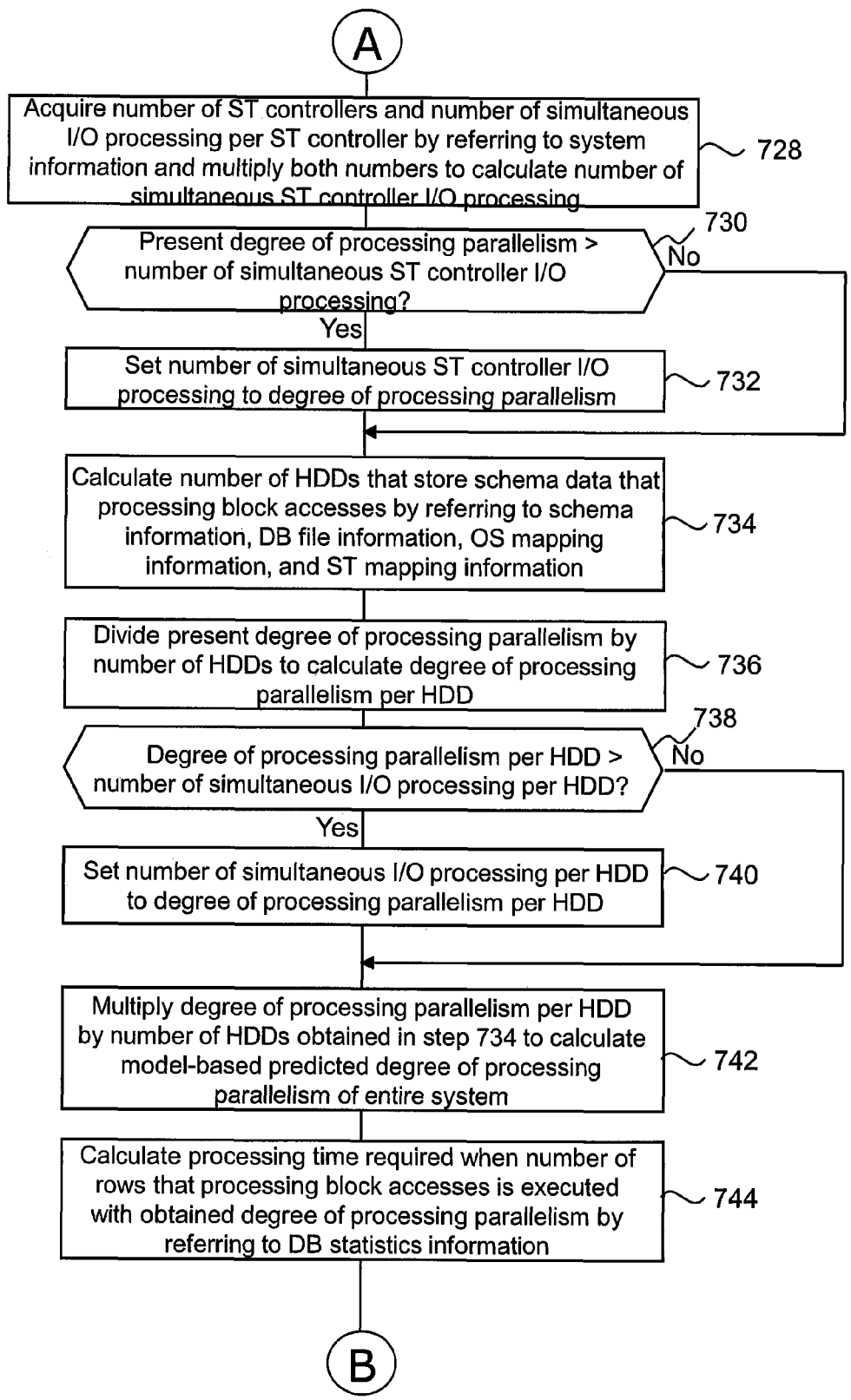
FIG. 8 is a second flowchart of the model-based predicted degree-of-processing-parallelism calculation processing according to Embodiment 1.

FIG. 7 is a first flowchart of a model-based predicted degree-of-processing-parallelism calculation processing according to Embodiment 1. FIG. 8 is a second flowchart of a model-based predicted degree-of-processing-parallelism calculation processing according to Embodiment 1.

The analysis and visualization program 195 specifies the number of processing blocks of a subject query by referring to the query plan information 128 in the DB monitoring information 197 (step 702). For example, in the case of the query 520, the number of processing blocks is 2. Subsequently, steps 708 to 742 are executed for the respective specified processing blocks. It is determined whether the model-based predicted degree of processing parallelism has been calculated for all processing blocks (step 704). When the model-based predicted degree of processing parallelism has been calculated for all processing blocks (step 704: Yes), the model-based predicted degree-of-processing-parallelism calculation processing ends (step 706).

The analysis and visualization program 195 specifies a scan type of the processing block by referring to the query plan information 128 in the DB monitoring information 197 (step 708) and determines whether the scan type is a table scan or an index scan (step 710). The table scan is a scan of acquiring records matching a condition by referring to tables only, and the index scan is a scan of acquiring table records matching a condition using an index. When it is determined that the scan type of the processing block is the table scan (step 710: No), "1" is set to the degree of processing parallelism (step 712). Although the table scan can be processing in parallel, since the degree of parallelism thereof is much smaller than the degree of processing parallelism intended by the present invention, the degree of processing parallelism is set to "1". On the other hand, when the scan type of the processing block is the index scan (step 710: Yes), the analysis and visualization program 195 acquires a scan index key of the processing block and the number of key value selected rows corresponding to the key value by referring to the DB statistics information 126 in the DB monitoring information 197 and sets the acquired value to the degree of processing parallelism (step 714).

For example, the processing block B of the query 520 is a subject, it can be specified from the query plan information 128 that the scan type of the processing block B is the index scan, the index key is I2.C3, and the key value is C3=10, and it can be specified from the DB statistics information 126 that the number of key value selected rows of I2.C3=10 is 100,000. Thus, the degree of processing parallelism of the processing block B at the end of step 714 is set to 100,000. Moreover, when the processing block A of the query 520 is a subject, it can be specified from the query plan information 128 that the scan type of the processing block A is the index scan, the index key is I1.C2, and the key value is C2=Max (C2), and it can be understood from the DB statistics information 126 that the number of key value selected rows of I1.C2=Max(C2) is 100. Thus, the degree of processing parallelism of the processing block A at the end of step 714 is set to 100. In this example, although one processing block is scanned once, if the degree of processing parallelism is not changed, one processing block may be scanned a plurality of times.

Subsequently, the analysis and visualization program 195 multiplies the number of kernel threads with the number of tasks per kernel thread by referring to the system information 196 to calculate a largest degree of parallelism of the DBMS 120 (step 716). In the case of the system information 196 illustrated in FIG. 5A, since the number of kernel threads is 64 and the number of tasks per kernel thread is 1,000, the largest degree of parallelism of the DBMS 120 is 64,000. In this case, the largest degree of parallelism is calculated assuming that the number of I/Os that can be submitted simultaneously for one task is 1. When a plurality of I/Os is submitted simultaneously for one task, a value obtained by multiplying the number of kernel threads, the number of tasks per number of kernel threads, and the number of simultaneous I/Os submitted for one task is the largest degree of parallelism.

Subsequently, the analysis and visualization program 195 compares the degree of processing parallelism at this point in time and the largest degree of parallelism of the DBMS 120 calculated in step 716 (step 718). When the largest degree of parallelism of the DBMS 120 is lower than the degree of processing parallelism (step 718: Yes), the analysis and visualization program 195 sets the largest degree of parallelism of the DBMS 120 to the degree of processing parallelism (step 720). For example, when the processing block B of the query 520 is a subject, since the degree of processing parallelism at this point in time (the degree of processing parallelism of the processing block B set in step 714) is 100,000 and the largest degree of parallelism of the DBMS 120 calculated in step 716 is 64,000 which is smaller than the degree of processing parallelism, 64,000 is set to the degree of processing parallelism of the processing block B. Moreover, when the processing block A of the query 520 is a subject, since the degree of processing parallelism at this point in time (the degree of processing parallelism set in step 714) is 100 and the largest degree of parallelism of the DBMS 120 is 64,000 which is larger than the degree of processing parallelism, the degree of processing parallelism of the processing block A is 100. The degree of processing parallelism of each processing block at this point in time may be a value obtained by multiplying a largest number of threads of the DBMS 120 (a value obtained by multiplying the number of kernel threads and the number of tasks per kernel thread) with a constant given from an external device.

Subsequently, the analysis and visualization program 195 multiplies the number of HBA ports and the number of simultaneous I/O processing per HBA port by referring to the system information 196 to calculate the number of simultaneous HBA I/O processing (first number of I/O processing) (step 722). In the case of the system information 196 illustrated in FIG. 5A, since the number of HBA ports is 6 and the number of simultaneous I/O processing per HBA port is 256, the number of simultaneous HBA I/O processing is 1,536.

Subsequently, the degree of processing parallelism at this point in time is compared with the number of simultaneous HBA I/O processing calculated in step 722 (step 724). When the number of simultaneous HBA I/O processing is lower than the degree of processing parallelism (step 724: Yes), the number of simultaneous HBA I/O processing is set to the degree of processing parallelism (step 726). When the processing block B of the query 520 is a subject, since the degree of processing parallelism of the processing block B at this point in time is 64,000 and the number of simultaneous HBA I/O processing calculated in step 722 is 1,536, which is smaller than the degree of processing parallelism, 1,536 is set to the degree of processing parallelism of the processing block B. Moreover, when the processing block A of the query 520 is a subject, since the degree of processing parallelism at this point in time is 100 and the number of simultaneous HBA I/O processing is 1,536 which is larger than the degree of processing parallelism, the degree of processing parallelism of the processing block A is 100.

Subsequently, the analysis and visualization program 195 multiplies the number of controllers of the storage apparatus 150 and the number of simultaneous I/O processing per controller by referring to the system information 196 to calculate the number of simultaneous controller I/O processing (second number of I/O processing) (step 728). In the case of the system information 196 illustrated in FIG. 5A, since the number of controllers of the storage apparatus 150 is 2 and the number of simultaneous I/O processing per controller is 1,000, the number of simultaneous controller I/O processing is 2,000.

Subsequently, the analysis and visualization program 195 compares the degree of processing parallelism at this point in time with the number of simultaneous controller I/O processing calculated in step 728 (step 730). When the number of simultaneous controller I/O processing is lower than the degree of processing parallelism (step 730: Yes), the number of simultaneous controller I/O processing is set to the degree of processing parallelism (step 732). On the other hand, when the number of simultaneous controller I/O processing is equal to or higher than the degree of processing parallelism (step 730: No), the degree of processing parallelism is not changed.

For example, when the processing block B of the query 520 is a subject, the degree of processing parallelism of the processing block B at this point in time is 1,536 and the number of simultaneous controller I/O processing calculated in step 728 is 2,000 which is larger than the degree of processing parallelism, the degree of processing parallelism of the processing block B is 1,536. Moreover, when the processing block A of the query 520 is a subject, since the degree of processing parallelism at this point in time is 100 and the number of simultaneous controller I/O processing 2,000 which is larger than the degree of processing parallelism, the degree of parallelism of the processing block A is 100.

Subsequently, the analysis and visualization program 195 calculates the number of HDDs of the disk 178 that stores the object data that the processing block accesses by referring to the schema information 122 and the DB file information 124 of the DB monitoring information 197, the OS mapping information 114 of the OS monitoring information 198, and the ST mapping information 172 of the ST monitoring information 199 (step 734) and divides the degree of processing parallelism at this point in time by the calculated number of HDDs to calculate the degree of processing parallelism per HDD (step 736). When the processing block B of the query 520 is a subject, the object accessed by the processing block B is "T2" (the access destination Object ID 238 of the query plan information 128), the DB file in which "T2" is stored is "FILE2" (File-ID 209 of the schema information 122), the device corresponding to "FILE2" is "Sde2" (the device name 212 of the DB file information 124), the logical storage area corresponding to the device "Sde2" is "Lun2" of "ST1" (the ST-ID 302 and LUN 304 of the OS mapping information 114), the number of HDDs that construct "Lun2" of "ST1" is 10 (the number of HDDs 404 of the ST mapping information 172), the degree of processing parallelism of the processing block B at this point in time is 1,536, and the degree of processing parallelism per HDD of the processing block B is 1,536/10153.

Moreover, when the processing block A of the query 520 is a subject, the object accessed is "T1" (the access destination Object ID 238 of the query plan information 128), the DB file in which "T1" is stored is "FILE1" (File-ID 209 of the schema information 122), the device corresponding to "FILE1" is "Sdd1" (the device name 212 of the DB file information 124), the logical storage area corresponding to the device "Sdd1" is "Lun1" of "ST1" (the ST-ID 302 and LUN 304 of the OS mapping information 114), the number of HDDs that construct "Lun1" is 10 (the number of HDDs 404 of the ST mapping information 172), the degree of processing parallelism of the processing block A at this point in time is 100, and the degree of processing parallelism per HDD of the processing block A is 10.

Subsequently, the analysis and visualization program 195 acquires the number (30 in FIG. 5A) of simultaneous I/O processing per HDD (third number of I/O processing) by referring to the system information 196 and compares the same with the degree of processing parallelism per HDD calculated in step 736 (step 738). When the number of simultaneous I/O processing per HDD is lower than the degree of processing parallelism per HDD (step 738: Yes), the number of simultaneous I/O processing per HDD is set to the degree of processing parallelism per HDD (step 740). On the other hand, when the number of simultaneous I/O processing per HDD is higher than the degree of processing parallelism per HDD (step 738: No), the degree of processing parallelism per HDD is not changed. Subsequently, the analysis and visualization program 195 multiplies the calculated degree of processing parallelism per HDD with the number of HDDs calculated in step 734 to calculate a model-based predicted degree of processing parallelism of the entire system (step 742). In the following description and the drawings, the model-based predicted degree of processing parallelism means the model-based predicted degree of processing parallelism of the entire system.

For example, when the processing block B of the query 520 is a subject, since the degree of processing parallelism per HDD calculated in step 736 is 153 and the number of simultaneous I/O processing per HDD is 30 which is smaller than the degree of processing parallelism per HDD, the degree of processing parallelism per HDD of the processing block B is 30, and 300 which is obtained by multiplying the degree of processing parallelism per HDD with 10 which is the number of HDDs is the model-based predicted degree of processing parallelism of the processing block B. Moreover, when the processing block A of the query 520 is a subject, since the degree of processing parallelism per HDD calculated in step 736 is 10 and the number of simultaneous I/O processing per HDD is larger than the degree of processing parallelism, the degree of processing parallelism per HDD of the processing block A is 10, and 100 which is a value obtained by multiplying the degree of processing parallelism per HDD with 10 which is the number of HDDs is the model-based predicted degree of processing parallelism of the processing block A.

Subsequently, the analysis and visualization program 195 calculates a processing time required when the number of rows of the object that the processing block accesses is executed using the model-based predicted degree of processing parallelism by referring to the sequential I/O performance 220 or the random I/O performance 222 of the DB statistics information 126 of the DB monitoring information 197 (step 742). When the processing block B of the query 520 is a subject, since the scan type of the processing block B is an index scan, the number of selected rows of the object "T2" to be accessed is 100,000, the model-based predicted degree of processing parallelism is 300, and the random access performance is 10 ms, the processing time of the processing block B is (number of selected rows)/(model-based predicted degree of processing parallelism)×(access×(access performance)=100,000/300×10 ms≈3.3 s. Moreover, when the processing block A of the query 520 is a subject, since the scan type of the processing block A is an index scan, the number of selected rows of the object "T1" to be accessed is 100, the model-based predicted degree of processing parallelism is 100, and the random access performance is 10 ms, the processing time of the processing block A is (number of selected rows)/(model-based predicted degree of processing parallelism)×(access performance) =100/100×10 ms≈10 ms.

With the processing described above, the processing behavior predicted when the query 520 is executed is that the processing of the processing block B is executed for 3.3 s with the degree of processing parallelism of 30, and then the processing of the processing block A is executed for 10 ms with the degree of processing parallelism of 10.

Figure 9:
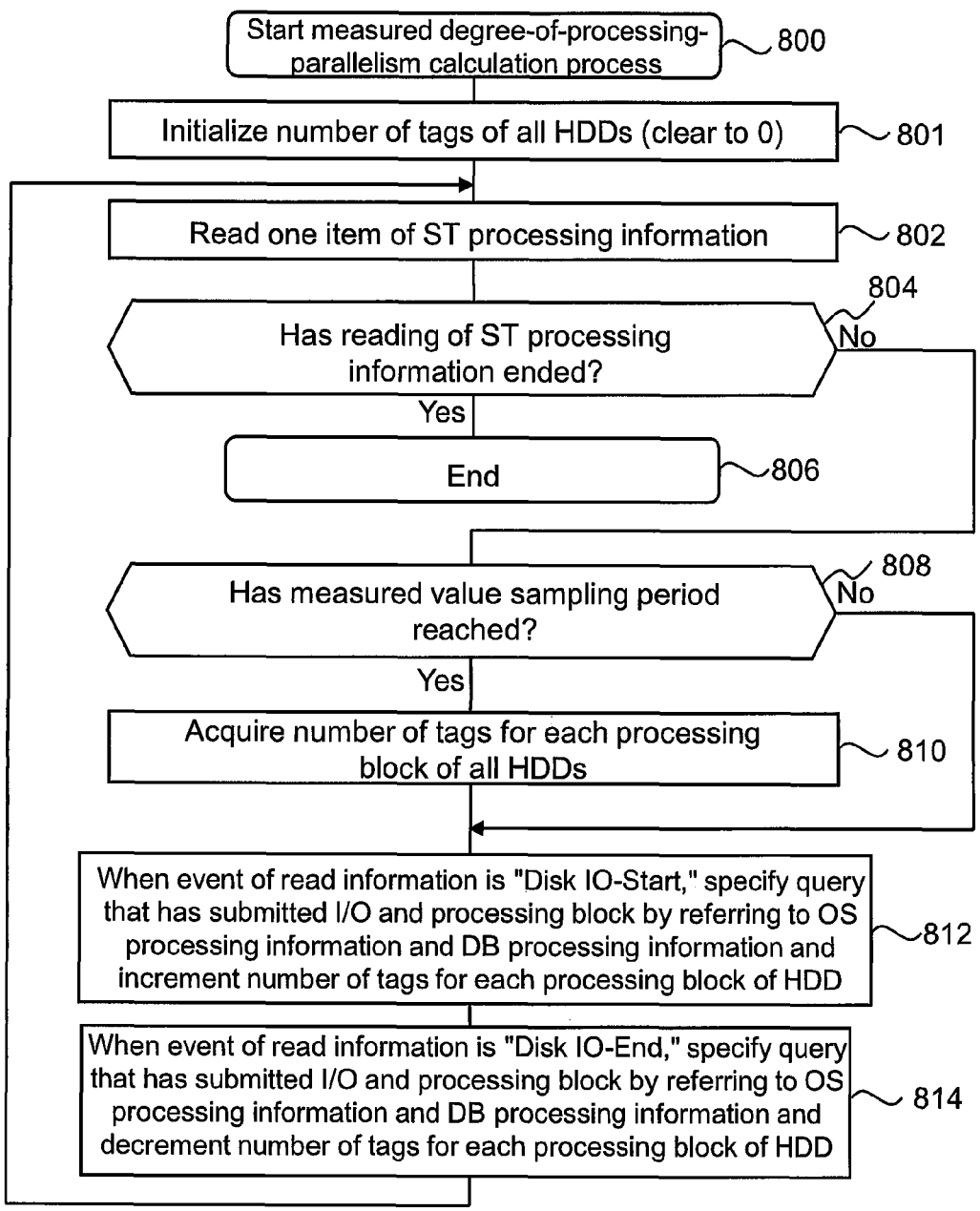
FIG. 9 is a flowchart of a measured degree-of-processing-parallelism calculation processing according to Embodiment 1.

FIG. 9 is a flowchart of a measured degree-of-processing-parallelism calculation processing according to Embodiment 1. In Embodiment 1, the number of tags for each HDD is calculated as the measured degree of processing parallelism. Specifically, the analysis and visualization program 195 reads the ST processing information which is an event base one by one and increments or decrements the number of tags of the HDD according to the event (the number of tags is incremented when the event is the start of a disk I/O and is decremented when the event is the end of a disk I/O). The analysis and visualization program 195 acquires the number of tags of each of the processing blocks of all HDDs at that point in time as the measured degree of processing parallelism every predetermined sampling cycle.

First, the analysis and visualization program 195 clears and initializes the number of tags of all HDDs to 0 (step 801), reads one entry of the ST processing information 174 in the ST monitoring information 199 (step 802), and determines whether all entries have been read (step 804). When all entries have not be read (step 804: No), the flow proceeds to step 808. When all entries have been read (step 804: Yes), the measured degree-of-processing-parallelism calculation processing ends (step 806).

The analysis and visualization program 195 determines whether the time stamp of one entry of the ST processing information 174 read in step 802 exceeds the predetermined sampling cycle for calculation of the measured value (step 808). When the time stamp exceeds the sampling cycle for calculation of the measured value (step 808: Yes), the analysis and visualization program 195 acquires the number of tags (a variable used for processing) for each of the processing blocks of all HDDs at that point in time as the number of tags at that point in time (step 810). On the other hand, when the time stamp does not exceed the sampling cycle for calculation of the measured value (step 808: No), nothing is performed. Here, the sampling cycle for calculation of the measured value may be given as a parameter when the analysis and visualization program 195 starts and may be set by the system administrator before the analysis starts.

Subsequently, when the event of one entry of the ST processing information 174 read in step 802 is a "start of disk I/O (Disk IO-Start)" event, the analysis and visualization program 195 specifies a query that has submitted an I/O of the event and a processing block in the query by referring to the OS processing information 116 of the OS monitoring information 198 and the DB processing information 130 of the DB monitoring information 197 and increments the number of tags for each processing block of the access destination disk 178 (step 812). For example, in the case of the "start of disk I/O" of the entry number 3 of the ST processing information 174, the identifier (IO-ID) of the I/O is "IO1". The entry of the OS processing information 116 having the same identifier "IO1" and the entry of the DB processing information 130 are retrieved and found to specify the query "Q1" that has submitted the I/O and the processing block "A" in the query.

Subsequently, when the event of one entry of the ST processing information 174 read in step 802 is an "end of disk I/O" (Disk IO-End), the analysis and visualization program 195 specifies a query that has submitted the I/O of the event and a processing block in the query by referring to the OS processing information 116 of the OS monitoring information 198 and the DB processing information 130 of the DB monitoring information 197 (the specifying procedure is the same as that of step 812) and decrements the number of tags for each processing block of the access destination disk 178 (step 814). Then, the analysis and visualization program 195 returns to step 802 and reads the subsequent one entry of the ST processing information 174.

According to the measured degree-of-processing-parallelism calculation processing, it is possible to calculate the number of tags of each processing block of each disk 178 at the measured value sampling cycle actual processing behavior of the DBMS 120 when a query was executed actually.

Subsequently, a graph displayed based on the model-based predicted degree of processing parallelism and the measured degree of processing parallelism calculated by the analysis and visualization program 195 will be described.

Figure 10A:
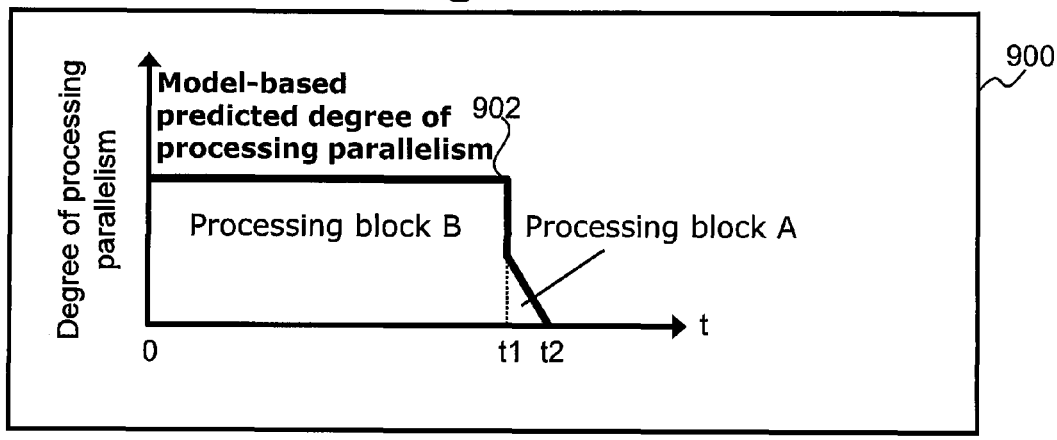
FIG. 10A is a diagram illustrating an example of the graph of model-based predicted degrees of processing parallelism according to Embodiment 1.

FIG. 10A is a diagram illustrating an example of the graph of model-based predicted degrees of processing parallelism according to Embodiment 1. The graph 900 illustrated in FIG. 10A is a graph of which the vertical axis represents a model-based predicted degree of processing parallelism and the horizontal axis represents time and which depicts the model-based predicted degrees of processing parallelism calculated by the model-based predicted degree-of-processing-parallelism calculation processing in a time-series manner. In the graph 900, a graph line 902 indicates the model-based predicted degree of processing parallelism, the portion corresponding to the period between time 0 and t1 indicates the model-based predicted degree of processing parallelism of the processing block B, and the portion corresponding to the period between t1 and t2 indicates the model-based predicted degree of processing parallelism of the processing block A.

Figure 10B:
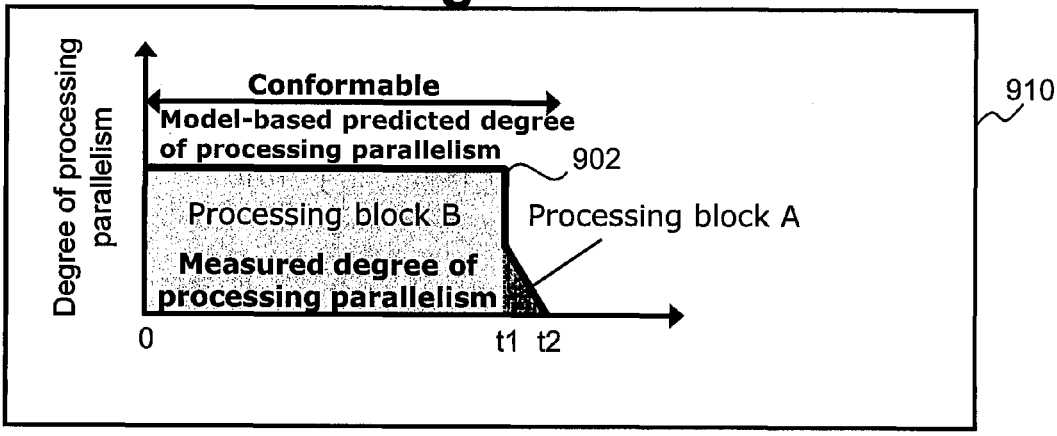
FIG. 10B is a diagram illustrating a first example of the graph of model-based predicted degrees of processing parallelism and measured degrees of processing parallelism according to Embodiment 1.

FIG. 10B is a diagram illustrating a first example of the graph of model-based predicted degrees of processing parallelism and measured degrees of processing parallelism according to Embodiment 1. The graph 910 illustrated in FIG. 10B is a graph of which the vertical axis represents the degree of processing parallelism (the model-based predicted degree of processing parallelism and the measured degree of processing parallelism) and depicts the model-based predicted degree of processing parallelism calculated by the model-based predicted degree-of-processing-parallelism calculation processing and the measured degree of processing parallelism calculated by the measured degree-of-processing-parallelism calculation processing in a time-series manner. In the graph 910, the model-based predicted degree of processing parallelism is indicated by a graph line 902 and the measured degree of processing parallelism is superimposed thereon with a color added. According to the example indicated by the graph 910, it can be understood that the model-based predicted degree of processing parallelism and the measured degree of processing parallelism conform to each other in the range of the period between t0 and t2 of the processing blocks A and B. Moreover, it can be determined that the DBMS 120 operates following the processing behavior predicted based on a model.

Figure 10C:
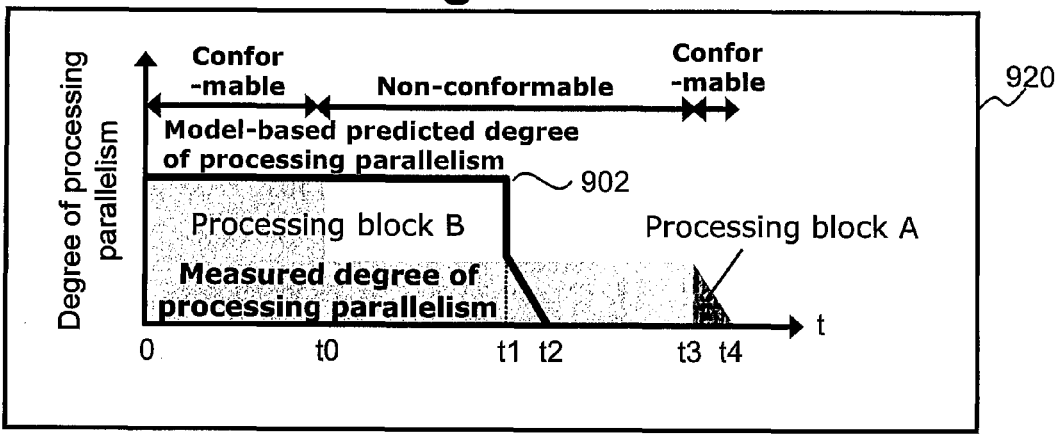
FIG. 10C is a diagram illustrating a second example of the graph of model-based predicted degrees of processing parallelism and measured degrees of processing parallelism according to Embodiment 1.

FIG. 10C is a diagram illustrating a second example of the graph of model-based predicted degrees of processing parallelism and measured degrees of processing parallelism according to Embodiment 1. The graph 920 illustrated in FIG. 10C is the same graph as the graph 910. According to the example indicated by the graph 920, it can be understood that the model-based predicted degree of processing parallelism and the measured degree of processing parallelism do not conform to each other in the range of the period between t0 and t3 which is a partial period of the processing block B, conform to each other in the range of the period between 0 and t0, of the processing block B, and conform to each other in the range of the processing block A. According to the graph 920, it can be determined that the DBMS 120 does not operate following the processing behavior predicted based on a model, and in this case, it can be easily determined that a problem has occurred, and the problem is highly likely to have occurred at t0.

As indicated by the graphs 910 and 920, by displaying the graph of the model-based predicted degrees of processing parallelism and measured degrees of processing parallelism of the respective processing blocks in a superimposed manner, it is possible to easily compare the model-based predicted degree of processing parallelism and the measured degree of processing parallelism. In the graph of measured degrees of processing parallelism of the graphs 910 and 920, I/Os occurring from programs and systems other than the DBMS 120 may be displayed in a different form (for example, the graph color may be changed to gray). In this case, I/Os that are not associated with "IO-ID" included in the DB processing information 130, the OS processing information 116, and the ST processing information 174 in the measured degree-of-processing-parallelism calculation processing 800 described above can be specified as I/Os occurring from programs and systems other than the DBMS 120. Due to this, it is possible to classify I/Os into I/Os occurring from the DBMS 120 and I/Os occurring from the other systems and programs, and to analyze the processing behavior of the DBMS 120 only.

Next, an example of a screen displayed by the analysis and visualization program 195 will be described.

Figure 11A:
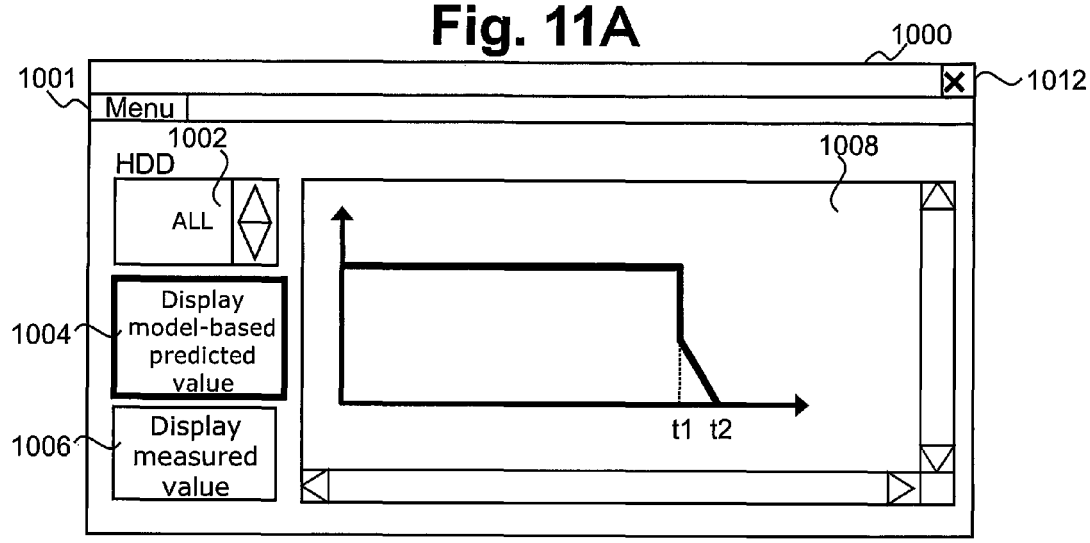
FIG. 11A is a diagram illustrating a screen display example including the graph of model-based predicted degrees of processing parallelism according to Embodiment 1.

FIG. 11A is a diagram illustrating a screen display example including the graph of model-based predicted degrees of processing parallelism according to Embodiment 1. When the analysis and visualization program 195 is executed, a window 1000 is displayed on the display 144 as illustrated in FIG. 11A. A menu bar 1001, a display subject HDD selection box 1002, a model-based predicted value display selection button 1004, a measured value display selection button 1006, a graph drawing area 1008, and a window close button 1012 are arranged on the window 1000, and an operator can input an instruction operation or the like on respective buttons using an input device such as a mouse.

Menus for inputting instructions such as start of analysis, switching of screen, and end of program are prepared in the menu bar 1001. The display subject HDD selection box 1002 allows an operator to select an HDD which is a subject of the graph to be drawn in the graph drawing area 1008. Here, when "ALL" is selected in the display subject HDD selection box 1002, the analysis and visualization program 195 draws the graph of the parallel processing degree of the entire system in the graph drawing area 1008. When the model-based predicted value display button 1004 is selected, the analysis and visualization program 195 puts the model-based predicted value display button 1004 into a selected state (in the drawing, a bold frame indicates the selected state) and draws the graph of model-based predicted degrees of processing parallelism calculated by the model-based predicted degree-of-processing-parallelism calculation processing in the graph drawing area 1008. Moreover, when the measured value display button 1006 is selected, the analysis and visualization program 195 puts the measured value display button 1006 into a selected state (in the drawing, a bold frame indicates the selected state) and draws the graph of measured degrees of processing parallelism calculated by the measured degree-of-processing-parallelism calculation processing in the graph drawing area 1008. In the example of FIG. 11A, only the model-based predicted degrees of processing parallelism are displayed.

Figure 11B:
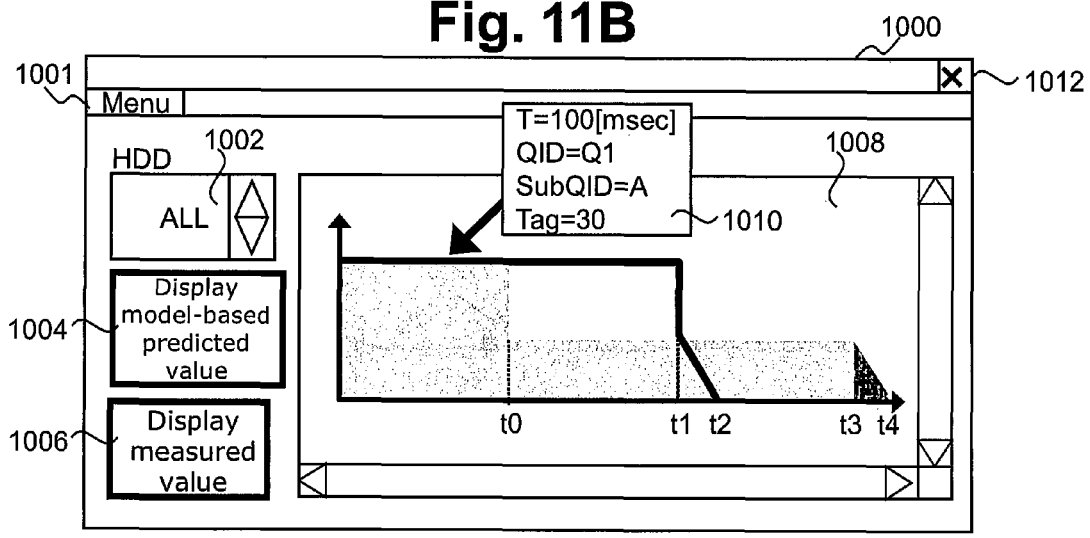
FIG. 11B is a diagram illustrating a screen display example including the graph of model-based predicted degrees of processing parallelism and measured degrees of processing parallelism according to Embodiment 1.

FIG. 11B is a diagram illustrating a screen display example including the graph of model-based predicted degrees of processing parallelism and measured degrees of processing parallelism according to Embodiment 1. In the example of FIG. 11B, the model-based predicted value display button 1004 and the measured value display button 1006 are selected, and the graph in which the model-based predicted degree of processing parallelism and the measured degree of processing parallelism are superimposed is displayed in the graph drawing area 1008. Moreover, when a mouse cursor hovers over a position of the graph drawn in the graph drawing area 1008, the analysis and visualization program 195 displays information (a time stamp, a query identifier, a processing block identifier, the degree of processing parallelism, and the like) corresponding to the position as a tooltip 1010. When the close button 1012 is mouse-clicked, the analysis and visualization program 195 closes the window 1000 and ends the processing.

By operating the screen displayed by the analysis and visualization program 195, the system administrator can display the graph of model-based predicted degrees of processing parallelism and measured degrees of processing parallelism and easily and appropriately determine how the DBMS 120 has operated actually in relation to the processing behavior predicted based on the model of the DBMS 120 and whether a problem has occurred.

Next, a display screen used for investigating the cause of a problem occurred will be described.

Figure 11C:
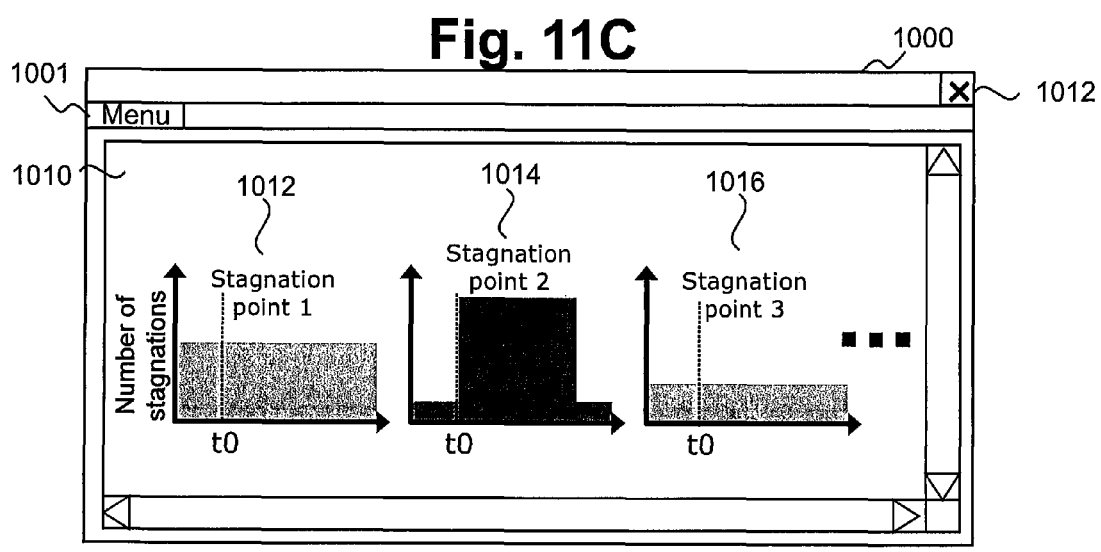
FIG. 11C is a diagram illustrating a screen display example including the graph of number of stagnations according to Embodiment 1.

FIG. 11C is a diagram illustrating a screen display example including the graph of number of stagnations according to Embodiment 1.

FIG. 11C is a screen including the graph displaying the state of stagnation for each point (element: processing stagnation point) in which processing stagnation is expected to occur in a computer system. Examples of the processing stagnation point include the inside of the DBMS 120 (the elements processinged by the DBMS 120) of the computer 100, the inside (the elements processinged by the OS 112) of the OS 112, the HBA which is an example of the I/F(1) 136, the communication network 140, the controller 154 of the storage apparatus 150, and a constituent element of the HDD 178.

Here, first, the processing of the analysis and visualization program 195 acquiring the stagnation state of the respective stagnation points will be described. The analysis and visualization program 195 increments or decrements the number of stagnations based on an event (for example, stagnation in the DBMS 120 can be specified by "IO-Submit" event to "IO-GetEvent" in the DB processing information 130) corresponding to the respective stagnation points by referring to the DB processing information 130 of the DB monitoring information 197, the OS processing information 116 of the OS monitoring information 198, and the ST processing information 174 of the ST monitoring information 199, and determines and acquires the numbers of stagnations of the stagnation points at the measured value sampling cycle similarly to the measured degree-of-processing-parallelism calculation processing. In this way, it is possible to acquire the number of stagnations at each measured value sampling cycle. The analysis and visualization program 195 displays the stagnation points as a time-series graph of numbers of stagnations using the number of stagnations at each measured value sampling cycle of the respective stagnation points.

The screen displayed in FIG. 11C may be displayed when the screen switching menu in the menu bar 1001 of the window 1000 is selected and may be automatically displayed when a problem occurs so that the point is specified. In the screen illustrated in FIG. 11C, the window 1000 includes a menu bar 1001, a close button 1012, and a graph drawing area 1010. In the graph drawing area 1010, the analysis and visualization program 195 draws a time-series graph of the number of stagnations of each stagnation point, in which the vertical axis represents the number of stagnations and the horizontal axis represents time. In FIG. 11C, a graph 1012 indicates a stagnation state of a stagnation point 1, a graph 1014 indicates a stagnation state of a stagnation point 2, and a graph 1016 indicates a stagnation state of a stagnation point 3. For example, when it was understood that a problem has occurred at time t0 from the graph of model-based predicted degrees of processing parallelism and measured degrees of processing parallelism, it is possible to detect the state of respective stagnation points at time t0 from the screen of FIG. 11C and to easily specify the cause thereof. For example, in the screen example of FIG. 11C, since it is understood that the stagnation state of the stagnation point 2 changes greatly at time t0, it is possible to easily specify that the stagnation point 2 is the cause of the problem.

Next, another screen example displayed by the analysis and visualization program 195 will be described.

FIG. 12A is a diagram illustrating a screen display example including the graph illustrating conformity and non-conformity between a model-based predicted value and a measured value of the degree of processing parallelism of an HDD according to Embodiment 1. FIG. 12B is a diagram illustrating conformity and non-conformity between a model-based predicted value and a measured value of the degree of processing parallelism of each HDD according to Embodiment 1.

In the screens illustrated in FIGS. 11A and 11B, it is possible display a theoretical degree of processing parallelism and a measured degree of processing parallelism for each HDD. If there is a small number of HDDs, the system administrator can display the graph of model-based predicted degrees of processing parallelism and measured degrees of processing parallelism for respective HDDs and determine whether respective HDDs operate properly. However, in the case of a computer system having several hundreds to thousands of HDDs, performing the same thing on the respective HDDs incurs a numerous amount of time.

Thus, the analysis and visualization program 195 automatically calculates the non-conformity ratio of the degree of processing parallelism (number of HDD tags) of each HDD and displays the calculation result to thereby reduce the number of analysis steps of the system administrator and to facilitate the behavior and performance analysis. Here, the non-conformity ratio of the degree of processing parallelism is the ratio of a non-conformity period to an entire processing time of a query. For example, if a model-based predicted degree of processing parallelism and a measured degree of processing parallelism of a certain HDD have such a relation as illustrated in FIG. 10C, the entire processing time is t4, the non-conformity period is t3−t0, and the non-conformity ratio can be expressed as t4/(t3−t0). Here, the analysis and visualization program 195 compares the model-based predicted degree of processing parallelism and the measured degree of processing parallelism at each measured value sampling cycle, for example and determines that both conform to each other if both are identical and that both do not conform to each other if both are not identical. The system administrator may allow the analysis and visualization program 195 to set a threshold value for determining the conformity and non-conformity and may determine the measured degree of processing parallelism conforms to the model-based predicted degree of processing parallelism if the measured degree of processing parallelism falls within the range of the threshold value.

FIG. 12A illustrates an example of a screen displaying, with the lapse of time, the number of conformable and non-conformable HDDs of which the model-based predicted degree of processing parallelism and the measured degree of processing parallelism conform or do not conform to each other in all HDDs of the computer system. The window 1000 includes a menu bar 1001, a close button 1012, and a graph drawing area 1010. The graph of number of conformable and non-conformable HDDs is drawn in the graph drawing area 1010 with the vertical axis representing the number of HDDs the horizontal axis representing the time elapsed. In the screen illustrated in FIG. 12A, a line 1102 indicates all HDDs, a graph 1104 indicates the number of conformable HDDs, and a graph 1106 indicates the number of non-conformable HDDs. The determination on conformity and non-conformity of respective HDDs in the entire processing may be made in such a way that an HDD of which the non-conformity ratio is 0% is conformable and that an HDD of which the non-conformity ratio is equal to or smaller than the parameter (for example, the non-conformity ratio 20%) that the system administrator gave to the analysis and visualization program 195 is conformable. With the screen illustrated in FIG. 12A, it is possible to easily specify how many HDDs operate following the processing behavior predicted based on a model during the entire processing by the DBMS 120.

FIG. 12B is a screen displaying the state of conformity and non-conformity between the model-based predicted degree of processing parallelism and the measured degree of processing parallelism in all HDDs of the computer system in the graph drawing area 1010 in a matrix form.

In the drawing, each rectangular portion in the matrix corresponds to one HDD. This rectangular portion is displayed such that an HDD of which the model-based predicted degree of processing parallelism and the measured degree of processing parallelism conform to each other, an HDD of which the model-based predicted degree of processing parallelism and the measured degree of processing parallelism do not conform to each other, and an HDD that is not accessed by the query are displayed in different forms (for example, different colors). Here, a rectangle 1110 indicates a conformable HDD, a rectangle 1112 indicates a non-conformable HDD, and a rectangle 1114 indicates a non-accessed HDD. The analysis and visualization program 195 may determine whether the respective HDDs are conformable or non-conformable in such a way that an HDD of which the non-conformity ratio is 0% is conformable and that an HDD of which the non-conformity ratio is equal to or smaller than the parameter (for example, the non-conformity ratio 20%) that the system administrator gave to the analysis and visualization program 195 similarly to the above.

In FIG. 12B, although all HDDs are displayed as one matrix, a group of storage apparatuses 150 or RAID groups may be displayed as one matrix. Moreover, when one rectangular portion in the matrix is selected by an operation such as a mouse-click, the analysis and visualization program 195 may display the graph of model-based predicted degrees of processing parallelism and measured degrees of processing parallelism as illustrated in FIG. 11B for the HDD corresponding to the selected rectangular portion. In this way, it is possible to analyze the state of conformity and non-conformity between the model-based predicted degree of processing parallelism and the measured degree of processing parallelism easily and in detail.

FIG. 12C is a diagram illustrating a screen display example illustrating HDDs in descending order of non-conformity ratio between the model-based predicted value and the measured value of the degree of processing parallelism according to Embodiment 1.

In the window 1000 illustrated in FIG. 12C, the analysis and visualization program 195 displays the ranks of HDDs having higher non-conformity ratios between the model-based predicted degree of processing parallelism and the measured degree of processing parallelism sequentially in the graph drawing area 1010. In the graph drawing area 1010, a rank number is displayed in an area 1120, an identifier (ST-ID) for identifying the storage apparatus 150 and an identifier (HDD-ID) for identifying the HDD 178 are displayed in an area 1122, and a non-conformity ratio is displayed in an area 1124.

In FIG. 12C, the HDD "HDD45" of the storage apparatus "ST1" has a non-conformity ratio of 32.5% and is on the first rank, the HDD "HDD6" of the storage apparatus "ST1" has a non-conformity ratio of 31.8% and is on the second rank, and the HDD "HDD74" of the storage apparatus "ST1" has a non-conformity ratio of 31.4% and is on the third rank.

Moreover, a detail display button 1126 is displayed in the graph drawing area 1010 at a position corresponding to each entry of the ranks. When an operator performs an operation (for example, a mouse-click) on the detail display button 1126, the graph of model-based predicted degrees of processing parallelism and measured degrees of processing parallelism of the corresponding HDD is displayed. In this way, it is possible to analyze the detailed state of conformity and non-conformity between the model-based predicted degree of processing parallelism and the measured degree of processing parallelism of the respective displayed HDDs having high non-conformity ratios.

Further, another screen display example displayed by the analysis and visualization program 195 will be described.

According to the screens illustrated in FIGS. 11A and 11B, it is possible to display the model-based predicted degree of processing parallelism and the measured degree of processing parallelism of a computer system and to easily determine whether the DBMS 120 operates following the processing behavior predicted based on a model and whether a problem has occurred. According to the screen illustrated in FIG. 11C, it is possible to easily specify the point where a problem has occurred. However, with these screens only, it is not possible to investigate and analyze the actual behavior of the DBMS 120 in more detail.

Thus, the analysis and visualization program 195 analyzes the system information 196, the DB monitoring information 197, the OS monitoring information 198, and the ST monitoring information 199 and displays the processing state of respective threads in the DBMS 120 to thereby facilitate the investigation and analysis of the actual behavior of the DBMS 120.

Figure 13A:
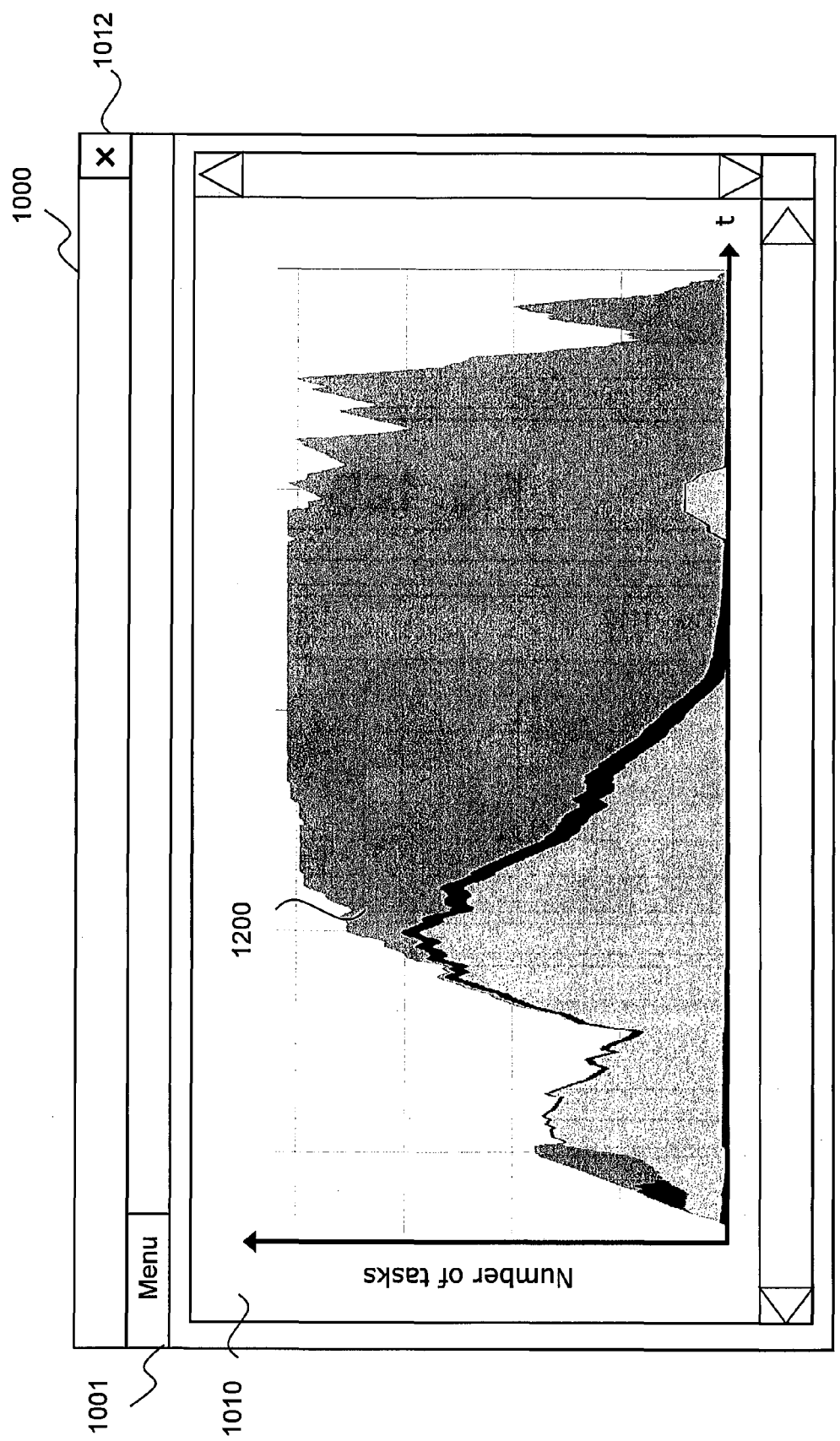
FIG. 13A is a diagram illustrating a screen display example including the graph of statistical values of the number of tasks for each table or index that the DBMS according to Embodiment 1 accesses.

FIG. 13A is a diagram illustrating a screen display example including the graph of statistical values of the number of tasks for each table or index that the DBMS according to Embodiment 1 accesses. In the graph 1200 illustrated in FIG. 13A, the number of tasks of each object being accessed is drawn in the graph drawing area 1010 of the window 1000 in a time-series manner while changing the display mode (for example, a graph color) for each object with the vertical axis representing the number of tasks of each object being accessed and the horizontal axis representing time. With this graph 1200, it is possible to easily specify how many tasks are access a certain object at each time period.

Figure 13B:
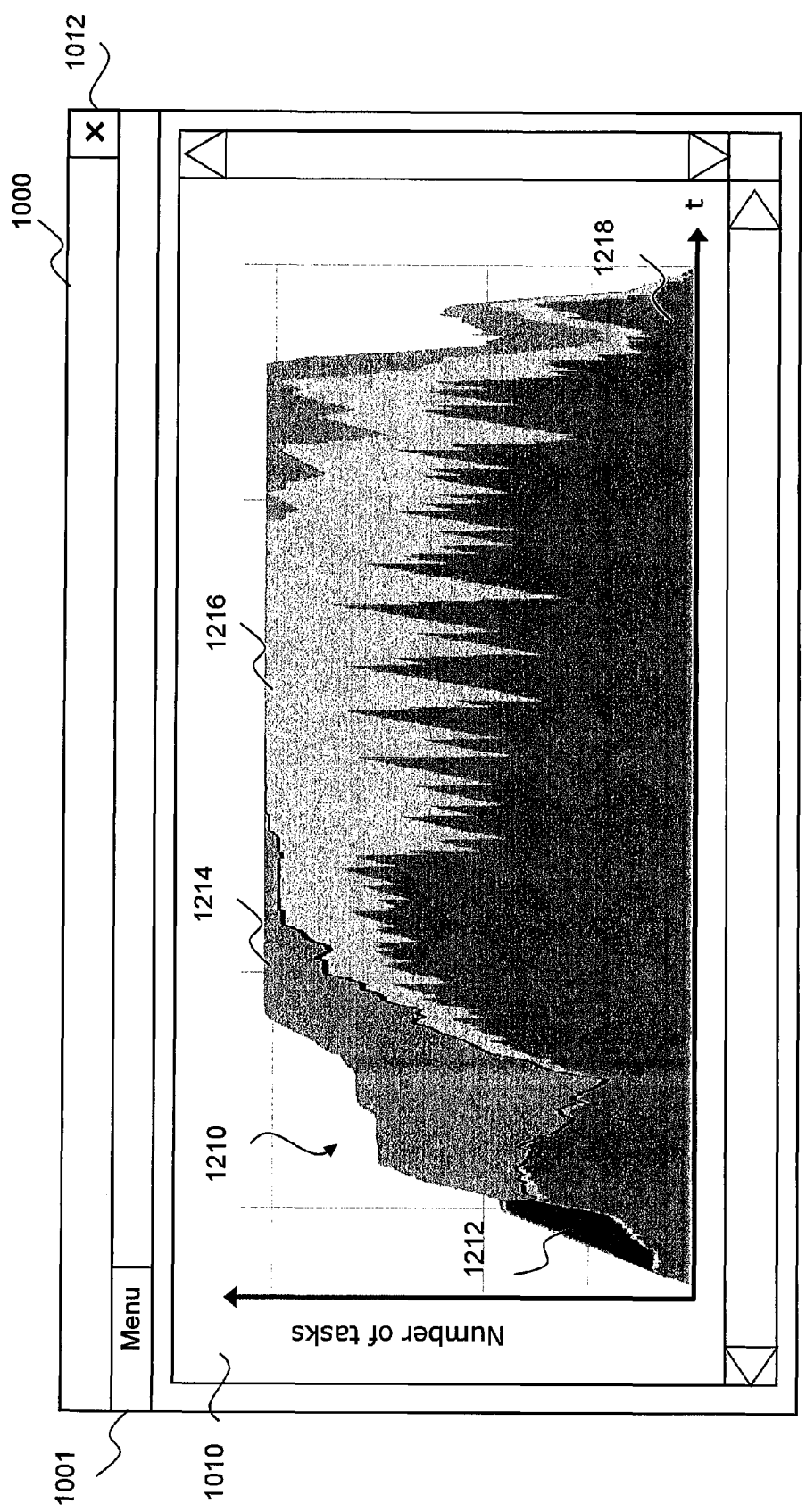
FIG. 13B is a diagram illustrating a first screen display example including the graph of statistical values for each task state according to Embodiment 1.

FIG. 13B is a diagram illustrating a first screen display example including the graph of statistical values for each task state according to Embodiment 1. In the graph 1210 illustrated in FIG. 13B, the number of tasks of each task state is drawn in the graph drawing area 1010 of the window 1000 in a time-series manner while changing a display mode (for example, a graph color) for each task state with the vertical axis representing the number of tasks of each task state and the horizontal axis representing time. Examples of the task state include a DB processing execution state, an I/O submitting state, a CPU allocation standby state, a DB buffer I/O completion standby state, a lock holding state, and a lock acquisition standby state. In the example indicated by the graph 1210, a graph 1212 indicates the number of tasks of a DB buffer I/O completion standby state, a graph 1214 indicates the number of tasks of a lock acquisition standby state, a graph 1216 indicates the number of tasks of a CPU allocation standby state, and a graph 1218 indicates the number of tasks of an I/O submitting state. According to the graph 1210, it is possible to easily specify whether a task operates at an upper limit where the task is executable in each time period and the task state.

Figure 13C:
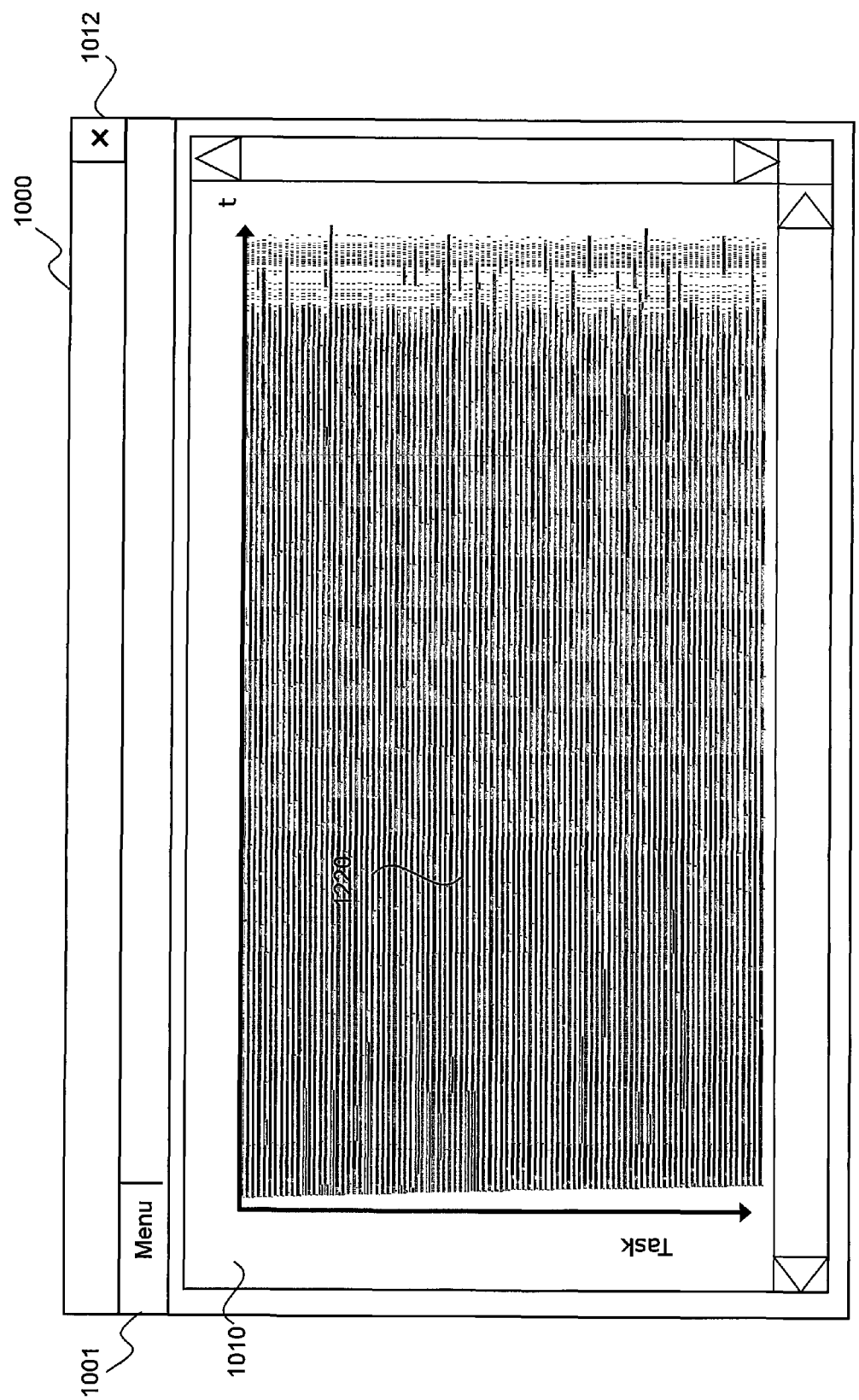
FIG. 13C is a graph illustrating a second screen display example including the graph of task states according to Embodiment 1.

FIG. 13C is a graph illustrating a second screen display example including the graph of task states according to Embodiment 1. In the graph 1220 illustrated in FIG. 13C, the task state is drawn in the graph drawing area 1010 of the window 1000 while changing the display mode (for example, a graph color) for each task state with the vertical axis representing the task (each line in the horizontal direction represents one task state) and the horizontal axis representing time. Although task states other than the lock holding state among the task states take only one state, since the lock holding state sometimes overlaps the other state (for example, a task may submit an I/O while holding the locked state), the graph of the lock holding state is drawn under the graphs of the other states. According to the graph 1220, it is possible to easily specify the state of each task in each time period.

In Embodiment 1, the model-based predicted degree of processing parallelism is calculated based on the number of selected rows corresponding to an index key value to be referred, the number of kernel threads, the number of tasks, the number of simultaneous HBA I/O processing, the number of simultaneous I/O processing of a storage controller, and the number of simultaneous I/O processing per HDD. However, although not described in Embodiment 1, other rate-controlling factors of the degree of processing parallelism, such as a queue length on an I/O path or a slot ring based on QOS control on a network in a virtual machine (VM) including a multiple stages of OSs, a file system, a scheduler, a device driver, and the like in an OS may be considered. In Embodiment 1, a means for acquiring information on portions serving as the rate-controlling factors may be provided, the information of these portions may also be calculated when the degree of processing parallelism is calculated.

In Embodiment 1, although a case where the DBMS 120 executes one query is described, when the DBMS 120 executes a plurality of queries simultaneously, the model-based predicted degree of processing parallelism and the measured degree of processing parallelism may be calculated in the same manner, and the calculation result may be displayed on the screen. In this way, it is possible to analyze the processing behavior when a plurality of queries is executed. In this case, the plurality of queries can be identified by "QID" included in the query plan information 128 and the DB processing information 130. When the model-based predicted degree of processing parallelism is calculated, the model-based predicted degree-of-processing-parallelism calculation processing 610 may be executed for the respective queries, and the calculated model-based predicted degrees of processing parallelism may be summed up. In this way, it is possible to calculate the model-based predicted degree of processing parallelism of the entire system. The measured degree of processing parallelism can be calculated by counting the same for the respective queries by the "QID". Moreover, when the graph of the measured degrees of processing parallelism during execution of a plurality of queries is displayed on a screen, the measured degrees of processing parallelism may be displayed while changing the display mode (for example, a graph color) for the respective queries. In this way, it is possible to analyze how the respective queries have been executed.

Figure 14:
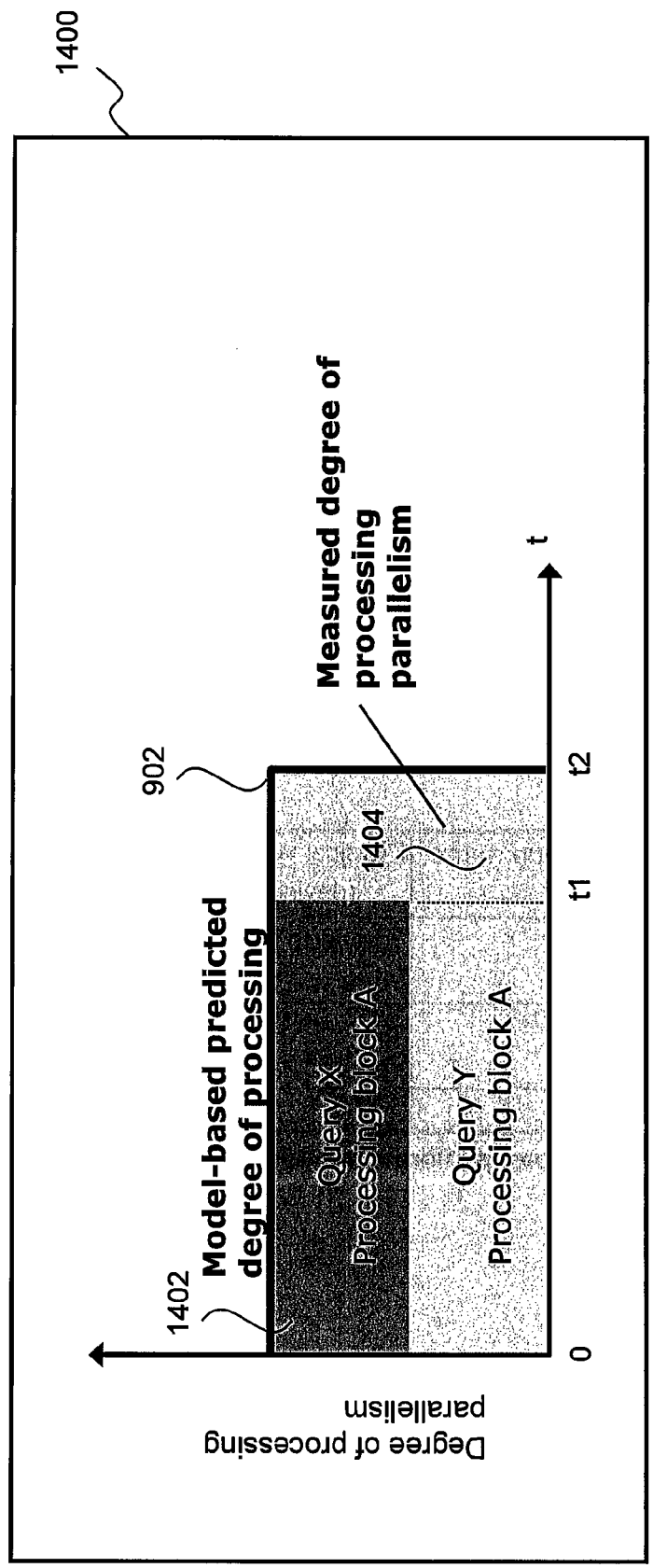
FIG. 14 is a graph illustrating a third example of the graph of model-based predicted degrees of processing parallelism and measured degrees of processing parallelism according to Embodiment 1.

FIG. 14 is a diagram illustrating an example of the graph of model-based predicted degrees of processing parallelism and measured degrees of processing parallelism when a plurality of queries (in this example, queries X and Y) is executed. In the graph 1400 illustrated in FIG. 14, a value obtained by summing up the model-based predicted degrees of processing parallelism of the queries X and Y is displayed as a graph line 902 of the model-based predicted degree of processing parallelism, and the colors of a measured degree of processing parallelism 1402 of the query X and a measured degree of processing parallelism 1404 of the query Y are displayed in different colors.

Figure 15A:
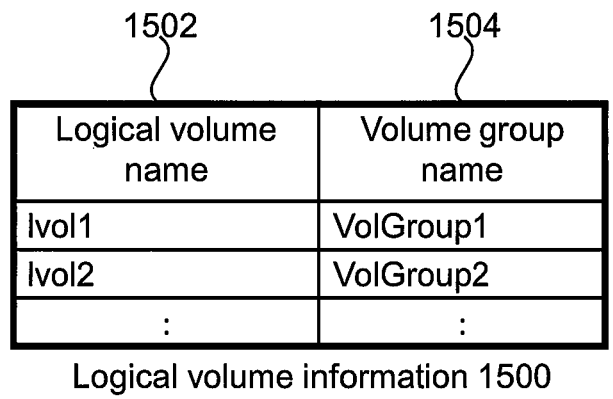
FIG. 15A is a block diagram of an example of logical volume information according to Embodiment 1.
Figure 15B:
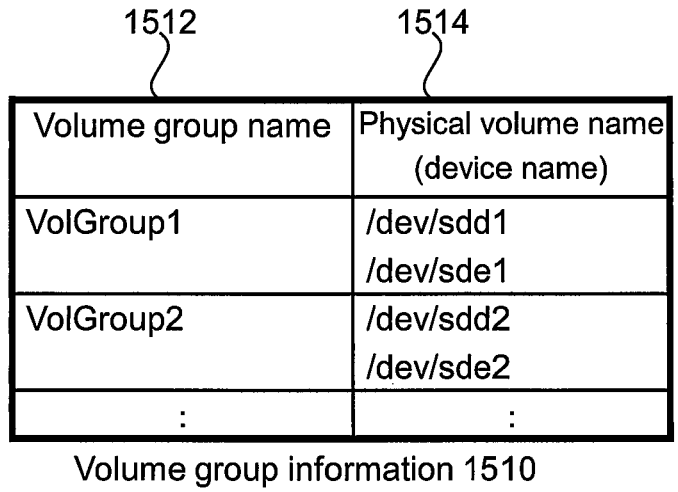
FIG. 15B is a block diagram of an example of volume group information according to Embodiment 1.

In Embodiment 1, although an abstraction layer of an I/O path like a logical volume manager (LVM), for example, is not described, the model-based predicted degree of processing parallelism and the measured degree of processing parallelism may be calculated taking the abstraction layer of an I/O path into consideration, the calculation result may be displayed, and the processing behavior of the DBMS 120 may be analyzed. FIGS. 15A and 15B are block diagrams of an example of logical volume information and volume group information when the LVM is used. Logical volume information 1500 is information on mapping of a logical volume which is a logical storage area and a volume group in which the logical volume is created and has an entry for each logical volume. Each entry includes a field 1502 in which a logical volume name for identifying a logical volume is registered and a field 1504 in which a volume group name for identifying a volume group in which the logical volume is created is registered. The volume group information 1510 is information on mapping of a volume group and a physical volume (device) that constitutes the volume group and has an entry for each volume group. Each entry includes a field 1512 in which a volume group name for identifying a volume group is registered and a field 1514 in which a physical volume (device) that constitutes the volume group is registered. Moreover, in this case, a DB file is created on a logical volume, and the created logical volume name is registered in the field 212 in which the device name of the DB file information 124 of FIG. 2B is registered. In the processing of calculating the model-based predicted degree of processing parallelism and the measured degree of processing parallelism, an HDD that the DBMS 120 accesses when executing the DB processing is specified by referring to the logical volume information 1500 and the volume group 1510.

In Embodiment 1, a method of analyzing the behavior and performance of the DBMS 120 focusing on the model-based predicted degree of processing parallelism (for example, the model-based predicted number of HDD tags) and the measured degree of processing parallelism (for example, the measured number of HDD tags) is described. However, for example, performance may be replaced with power consumption, a model-based predicted power consumption when a query is executed by a computer system and a measured power consumption when a query is actually executed may be calculated, and the values may be used as power consumption monitoring information. In particular, since a large-scale system consumes a large amount of power, it may be useful to calculate a model-based predicted power consumption in advance and to present the same to a system administrator. Moreover, a model-based predicted power consumption and a measured power consumption may be displayed in a comparable manner to facilitate analysis of power consumption.

As described above, according to Embodiment 1, the system administrator can easily determine whether the DBMS 120 operates following the processing behavior predicted based on a model or not. Moreover, when the DBMS 120 does not operate in such a manner, it is possible to understand that a problem has occurred and to easily specify a point that causes the problem. Further, it is possible to easily investigate and analyze the actual behavior of the DBMS 120 and to dramatically reduce the time required for analyzing the behavior and performance of the DBMS 120.

Embodiment 2

Hereinafter, Embodiment 2 will be described. Different features from Embodiment 1 will be described mainly, and the same features as Embodiment 1 will not be provided or may be simplified.

In Embodiment 1, the analysis and visualization program 195 calculates the model-based predicted value and displays the model-based predicted value and the measured value on the display 144. However, in Embodiment 2, the analysis and visualization program 195 may not necessarily calculate or display the model-based predicted value. In Embodiment 2, the DB monitoring information output unit 132 outputs event-driven information associated with execution of tasks with the progress of query execution as DB processing information 2200 and 2400 described later, and the analysis and visualization program 195 acquires the information and displays a graph indicating the execution state of tasks on a screen.

Naturally, the first and second embodiments may be combined. In a combination of the first and second embodiments, the following flow can be considered.

(A) The analysis and visualization program 195 calculates the model-based predicted value and the measured value of the processing behavior of the DBMS 120 based on various items of acquired monitoring information and displays the graphs thereof (FIGS. 11A to 11C, and 12A to 12C if necessary (for example, in response to the request from the system administrator)) on the display 144.

(B) The system administrator determines whether a problem has occurred in the processing of the DBMS 120 by looking on these graphs. When it is determined in (B) that a problem has occurred, the system administrator can specify the problem occurred by performing the following operations. An example of the specified problem is that tasks are executed sequentially although the DBMS 1202 can execute tasks in parallel.

For example, the system administrator causes the analysis and visualization program 195 to display the graph (for example, FIGS. 13A to 13C) relating to the behavior of the DBMS 120 by operating the menus on the screen displayed on the display 144. By doing so, the system administrator can analyze a thread execution state, an object access state, and the like.

Moreover, for example, the system administrator causes the analysis and visualization program 195 to display a visualization window 2500 (FIG. 25) and causes the analysis and visualization program 195 to draw a task behavior visualization tree (for example, FIG. 26 or 30) and/or a data structure visualization tree (for example, FIG. 27) on the visualization window 2500 by operating the menus on the screen displayed on the display 144. A display mode of respective nodes in the task behavior visualization tree and the data structure visualization tree changes according to the progress of query execution (an event type in the DB processing information illustrated in FIGS. 22 and 24). In this way, the system administrator can specify a problem occurred during execution of queries.

Hereinafter, Embodiment 2 will be described in detail.

Figure 16:
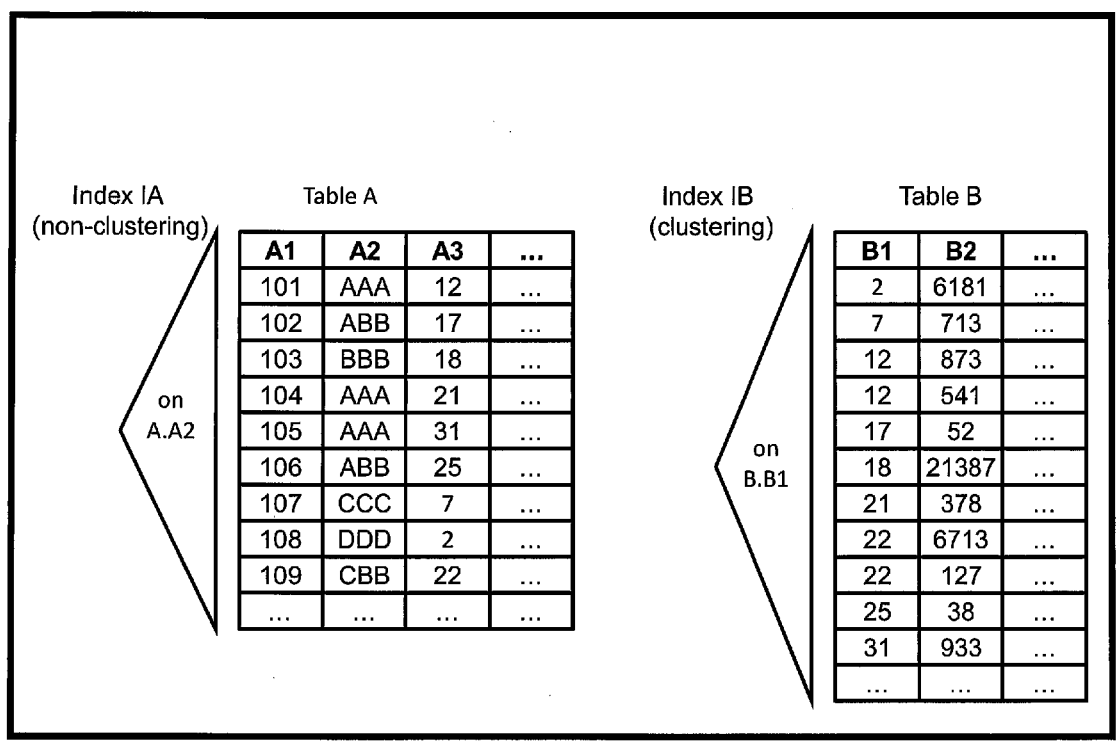
FIG. 16 illustrates an example of a schema group according to Embodiment 2.

In Embodiment 2, an index IA, a table A, an index IB, and a table B are present as schema as illustrated in FIG. 16, for example. The index IA spreads in a column A2 of the table A, and the index IB spreads in a column B1 of the table B.

Figures 17A, 17B, 17C:
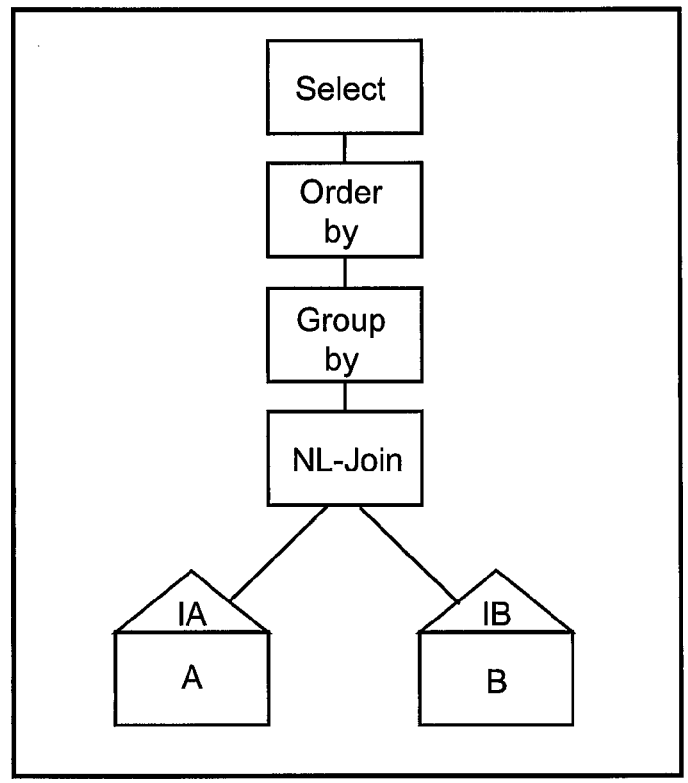
FIG. 17A illustrates an example of a query according to Embodiment 2.
FIG. 17B illustrates an example of a query plan according to Embodiment 2.
FIG. 17C illustrates an example of a query result according to Embodiment 2.

When a query illustrated in FIG. 17A is received with respect to a schema group illustrated in FIG. 16, the DBMS 120 generates a query plan illustrated in FIG. 17B and acquires a query result illustrated in FIG. 17C, for example, as the result of the execution.

Figure 18:
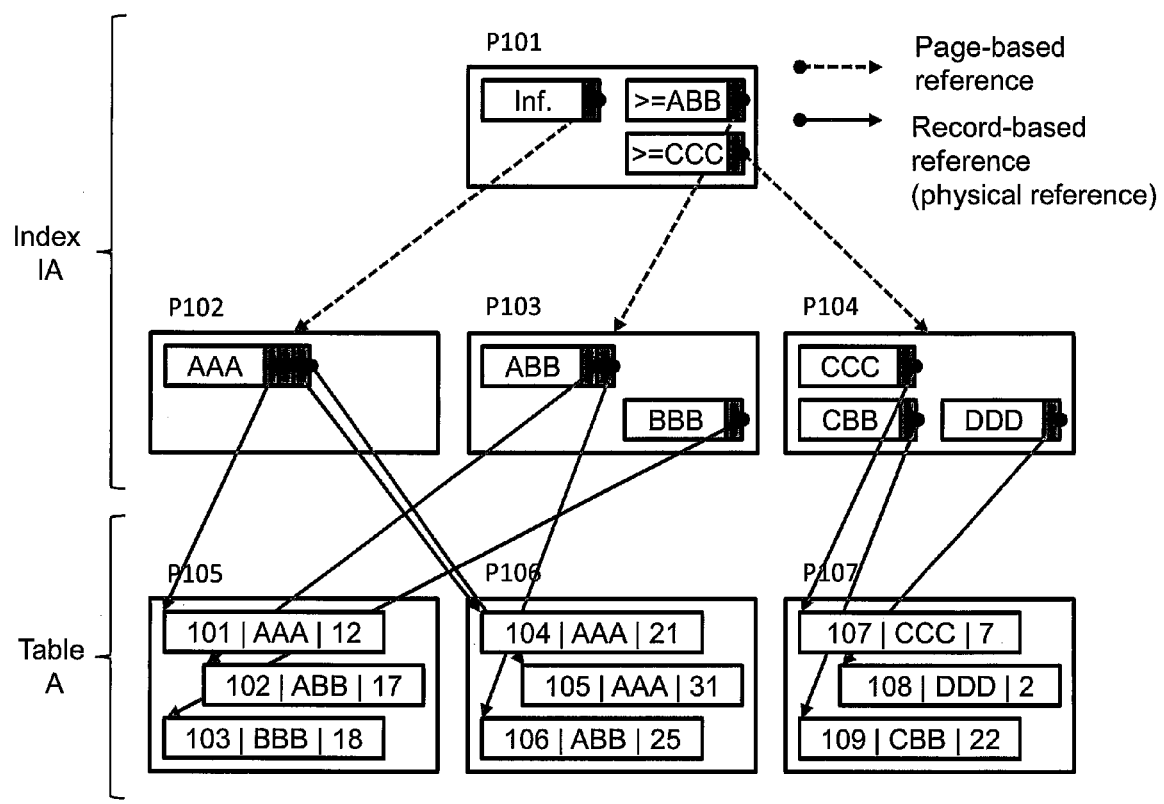
FIG. 18 illustrates a data structure of an index IA and a relational table A according to Embodiment 2.
Figure 19:
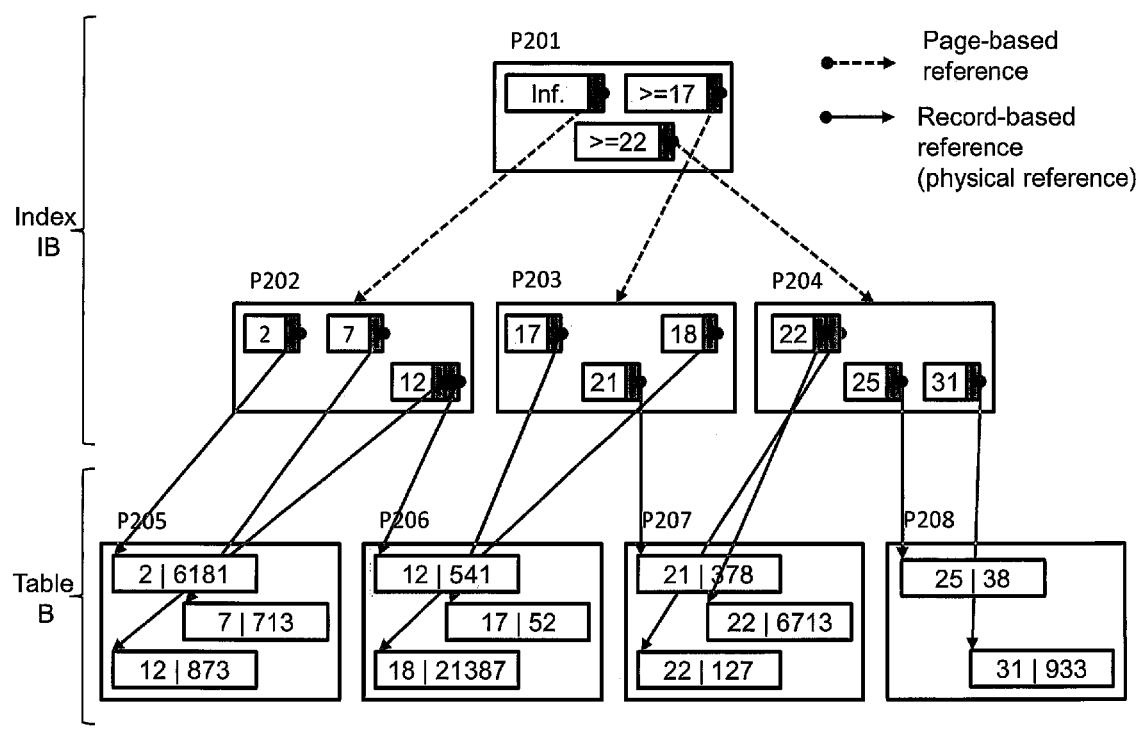
FIG. 19 illustrates a data structure of an index IB and a relational table B according to Embodiment 2.

Among the schema group illustrated in FIG. 16, the index IA and the table A have a data structure as illustrated in FIG. 18, and the index IB and the table B have a data structure as illustrated in FIG. 19. In FIGS. 18 and 19, "P" indicates a DB page. Hereinafter, "Pxxx" (xxx is a 3-digit integer) will be denoted referred to as a DB page #xxx. For example, according to FIG. 18, a value in the record including a value equal to or larger than "ABB" as the value of the column A2 can be acquired from DB pages #105 and #106 by referring to a DB page #103 from a DB page #101 according to page-based reference and referring to the DB pages #105 and #106 from the DB page #103 according to record-based reference.

Although the index has a tree structure in this example, the index may have other structures such as a hash structure.

Moreover, although the record-based reference is physical reference (for example, which uses a page ID and a storage location in a page) in this example, the record-based reference may be logical reference (which uses a unique main key). In this case, it is possible to obtain an index entry from secondary indices and obtain a record by retrieving a main index.

Moreover, although the data structure of the table is a flat file data structure, the table may has a tree structure similarly to the index such as an index configuration table.

The information representing the data structure is generally too big to store in the memory 110 of the computer 100. Thus, the DBMS 120 creates a data structure summary table which is the summary of the information and stores the data structure summary table in the memory 110.

FIG. 20 illustrates an example of the data structure summary table 2000. This table 2000 includes a page ID, an object ID (the ID of a schema having a value stored in the DB page), a parent DB page ID (the ID of a parent DB page (reference source DB page) of the DB page), a key range (upper and lower limits of usable key values).

It is assumed that twenty five tasks #1 to #25 are present.

Figure 21:
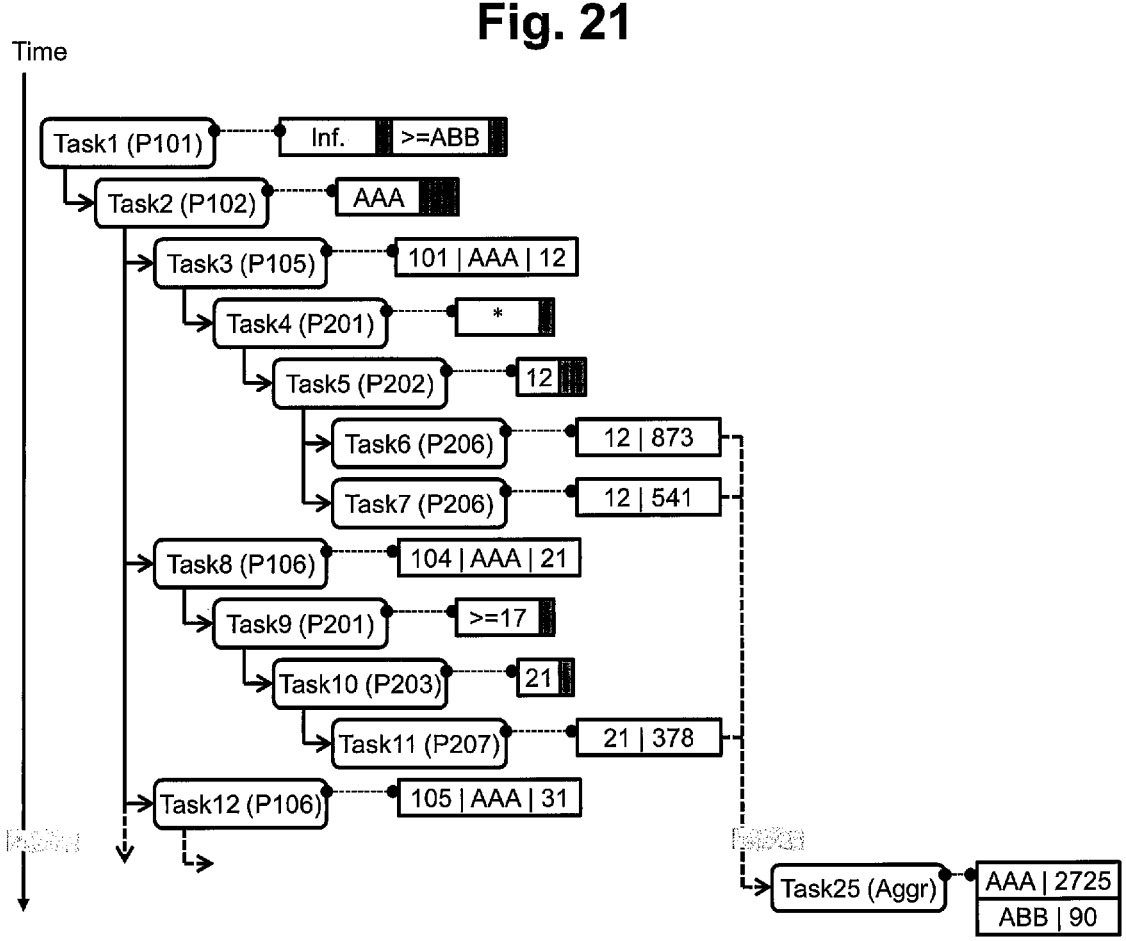
FIG. 21 illustrates how a conventional DBMS executes tasks sequentially.

A conventional DBMS executes twenty five tasks sequentially as illustrated in FIG. 21. DB processing information indicating a group of records of which the execution histories are described is DB processing information 2200 illustrated in FIG. 22, for example. The DB processing information 2200 has at least one record. One record corresponds to one task execution history and includes an entry number (history number), a time stamp (task execution time or number), a thread ID (the ID of a thread having an executed task), an event type (the type of an event performed by execution of a task), a task ID (the ID of an executed task), and a parent task ID (the ID of a parent task of an executed task). The DB processing information 2200 is a modification of the DB processing information 130 illustrated in FIG. 2E.

Figure 23:
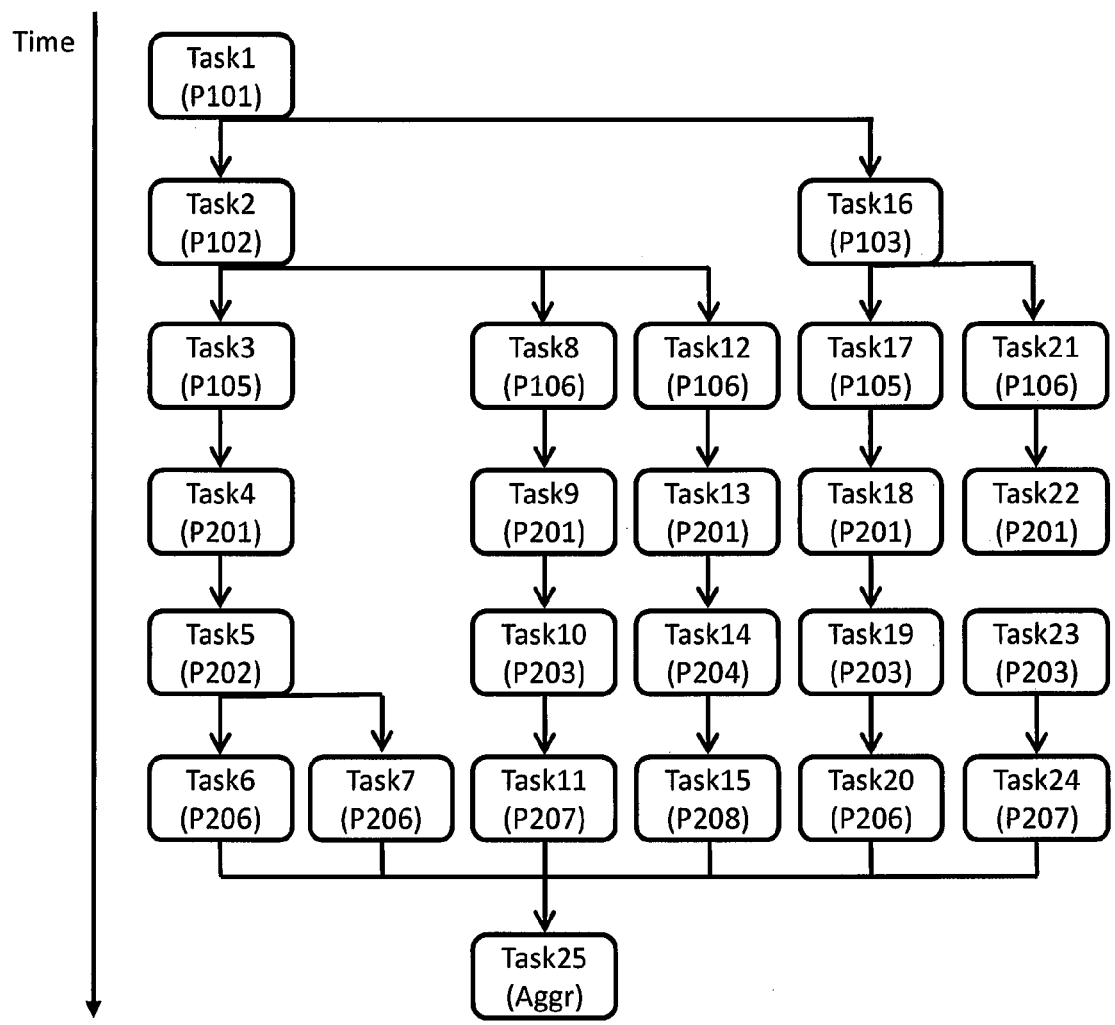
FIG. 23 illustrates how a DBMS according to Embodiment 2 executes tasks in parallel.

However, the DBMS 120 is configured to execute tasks in parallel and executes the tasks #1 to #25 in the manner illustrated in FIG. 23. More specifically, the DBMS 120 generates and executes a task #1, generates new tasks #2 and #16 based on execution result of a DB operation corresponding to the executed task #1 when a next DB operation is executed based on the execution result, and executes the newly generated tasks #2 and #16 in parallel. In this way, as can be understood from comparison between FIGS. 21 and 23, it is possible to shorten the time required for execution of queries. The DB processing information when the tasks #1 to #25 are executed as illustrated in FIG. 23 is DB processing information 2400 illustrated in FIG. 24, for example. The DB processing information 2400 is stored in the memory 110 of the computer 100.

As can be understood by comparing the records of the entry numbers 6 and 7 of FIG. 22 and the records of the entry numbers 6 and 7 of FIG. 24, the conventional DBMS executes operations corresponding to the task #2 sequentially whereas the DBMS 120 according to Embodiment 2 executes the operation corresponding to the task #2 and the operation corresponding to the task #16 in parallel.

If a certain problem occurs in the behavior of the conventional DBMS, since tasks are performed in the occurrence order, it may be not difficult to specify the problem.

However, when a certain problem occurs in the behavior of such a DBMS executing tasks in parallel as that of Embodiment 2 (and Embodiment 1), since the order in which tasks are executed is not defined, it is difficult to specify the problem.

Visualizing the behavior of the DBMS can be one method of solving this problem.

However, although the behavior (how the DBMS operates in a computer) of the DBMS is visualized only, it may be difficult for a system administrator to specify the problem. For example, the analysis and visualization program can visualize the behavior of the DBMS by displaying the DB processing information 2400 illustrated in FIG. 24 in a text form. However, the system administrator needs to follow the records in the DB processing information in a time-series order in order to specify the problem. Thus, the load for specifying the problem is large.

Thus, in Embodiment 2, the analysis and visualization program 195 acquires the DB processing information 2400 from the computer 100 and stores the acquired DB processing information 2400 in the memory 192. The analysis and visualization program 195 visualizes the behavior of the DBMS 120 based on the DB processing information 2400 in the memory 192 according to the following rules.

(a) A task object which is an object indicating an executed task is drawn.

(b) A display mode of the task object is changed according to a change in a task state (the type of an event performed by execution of the task) indicated by the task object.

For example, a task object may be a node of a tree and may be a segment region (for example, a fan-shaped region) obtained by evenly dividing a predetermined region (for example, a circle) by the number of executed tasks. Moreover, various forms such as colors, patterns, brightness, the size of task objects (for example, nodes), a line thickness, or changing from a non-displayed state to a displayed state can be employed as the display mode that is changed according to a task state. Moreover, the analysis and visualization program 195 may change the display mode of the task object in an animated manner. Further, the analysis and visualization program 195 may draw objects (for example, edges (links) that connect task objects) indicating a parent-child relation of tasks based on the DB processing information 2400.

When the DB size increases, the number of task objects increases also, and thus, there is a possibility that when the analysis and visualization program 195 draws the above-described data, too many contents are drawn so that the user (analyzer) has difficulties in analyzing the behavior. Thus, the analysis and visualization program 195 may allow a display form of displaying all task objects and a display form of displaying partial designated task objects to be switched according to a user instruction. Moreover, when partial task objects to be displayed are selected, a user may place a mouse pointer on a task object to be selected and perform a zoom-in or zoom-out operation about the task object so that a range of task objects to be displayed can be selected.

Hereinafter, several specific examples will be described.

Figure 25:
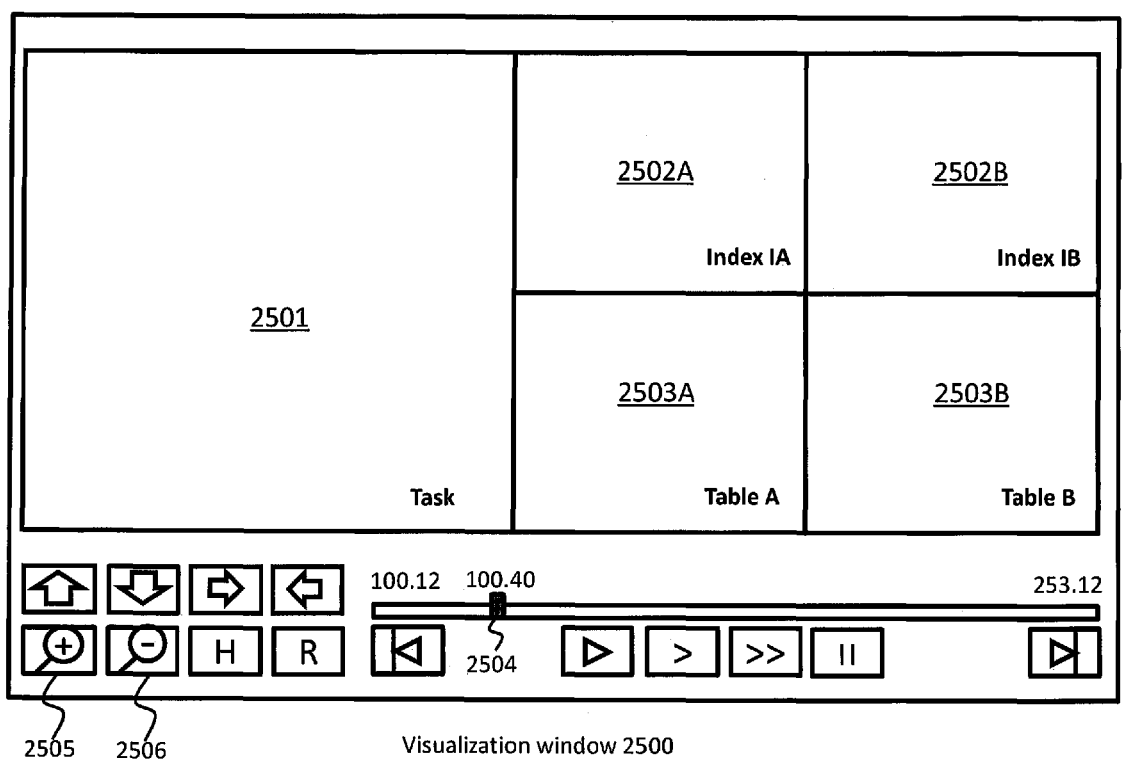
FIG. 25 illustrates a visualization window according to Embodiment 2.

Upon receiving information indicating an operation for displaying a visualization window from the input-output device 188, the analysis and visualization program 195 displays such a visualization window 2500 as illustrated in FIG. 25 on the display 144.

The visualization window 2500 includes a task display area 2501 in which a task behavior visualization tree is displayed and an object display area in which an object data structure visualization tree is displayed. The object display area includes one or more index display areas 2502A and 2502B in which one or more data structure visualization trees corresponding to one or more indices are displayed and one or more table display areas 2503A and 2503B in which one or more data structure visualization trees corresponding to one or more tables are displayed. A index display area and a table display area referenced from the index are arranged in a line along a predetermined direction (for example, a vertical direction).

Moreover, the visualization window 2500 includes a time stamp slider 2504, a zoom-in button 2505, and a zoom-out button 2506. The time stamp slider 2504 is an example of a time stamp adjustment tool, one end of a bar 2505 along which the slider 2504 runs is an execution start time (the time indicated by the time stamp of the starting task of the DB processing information 2400) of a root task (first task), and the other end of the bar 2505 is the time (the time indicated by the time stamp of the ending record of the DB processing information 2400) at which a DB operation corresponding to an end task (final task) ends.

Figure 26:
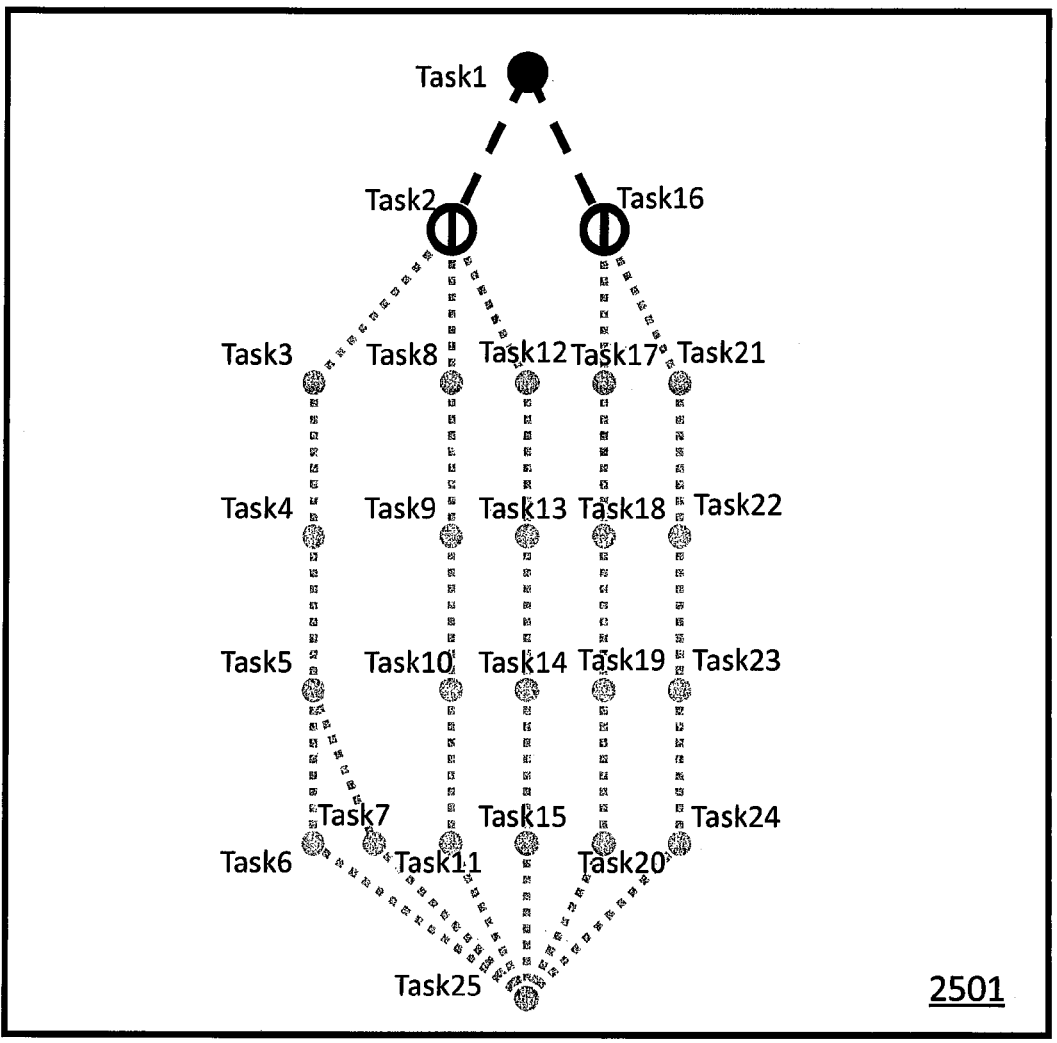
FIG. 26 illustrates an example of a task behavior visualization tree according to Embodiment 2.

FIG. 26 illustrates an example of a task behavior visualization tree drawn in the task display area 2501.

The task behavior visualization tree is a graph in which tasks are nodes and parent-child relations of tasks are edges (links).

Twenty five nodes corresponding to twenty five tasks #1 to #25 are arranged in a predetermined direction (for example, a vertical direction) in old-to-new order of time stamps. In FIG. 26, for example, a root task (the task of which the time stamp is the oldest) is on the top, and an end task (the task of which the time stamp is the oldest) is at the bottom. The analysis and visualization program 195 evenly divides a vertical coordinate range of a display range of the task behavior visualization tree by the number of nodes arranged in the vertical direction and draws the nodes at the evenly divided coordinate positions. In this division, the analysis and visualization program 195 regards two or more nodes of which the time stamps of the event type "Task Start" are substantially the same as one node. Thus, it can be understood from this tree that two or more tasks corresponding to two or more nodes having the same vertical coordinate start at substantially the same time.

Moreover, in the task behavior visualization tree, nodes at the same distance from a node corresponding to a root task are arranged at an equal interval along the horizontal direction.

The state corresponding to a display mode of nodes and edges of the task behavior visualization tree includes four types of states which are tasks having not started, tasks being in I/O operation (tasks of which the event type is "Task Start" or "IO-Submit"), tasks being in operation (tasks of which the event type is "IO-GetEvent" or "OP Start"), and tasks having completed operations (tasks of which the event type is "OP End"). The analysis and visualization program 195 draws all nodes and edges in a display mode corresponding to the task having not started in the initial state and then changes the display mode of nodes and edges to a display mode corresponding to a task state at a designated time. The tree illustrated in FIG. 26 illustrates a task execution state at the time stamp "103.00". According to the DB processing information 2400 illustrated in FIG. 24, at the time stamp "103.00," the event type of the task #1 is "OP End," the event types of the tasks #2 and #16 are "IO- Submit," and the other tasks have not started. Due to this, the analysis and visualization program 195 changes a display mode of nodes and edges corresponding to the task #1 to a display mode corresponding to a task having completed an operation (for example, in an animated manner, after the display modes (tasks being in I/O operation and tasks being in operation) in the drawing are displayed), changes a display mode of nodes and edges corresponding to the tasks #2 and #16 to a display mode corresponding to a task being in I/O operation, and causes a display mode of nodes and edges corresponding to the other tasks to be left in the display mode corresponding to the task having not started.

FIG. 27 illustrates an example of a data structure visualization tree drawn in the schema display areas 2502A, 2502B, 2503A, and 2503B.

The data structure visualization tree is a graph in which DB pages are nodes and dependencies between pages on the data structure are edges (links).

The analysis and visualization program 195 acquires the data structure summary table 2000 from the computer 100 and stores the acquired data structure summary table 2000 in the memory 192. The analysis and visualization program 195 draws a data structure visualization tree based on the data structure summary table 2000 and the DB processing information 2400 in the memory 192.

A parent-child relation between DB pages on the data structure may be a link or the like in the case of a link array. When the data structure is a flat file data structure, the analysis and visualization program 195 may arrange and draw nodes corresponding to a DB page in the order of page addresses rather than drawing the same as a graph structure. Moreover, the analysis and visualization program 195 may draw the entire database rather than the data structure by arranging the same in the order of DB page addresses.

Nodes at the same distance from a node corresponding to a root page are arranged at an equal interval along the horizontal direction.

The state corresponding to a display mode of nodes and edges of the data structure visualization tree includes four types of states which are pages corresponding to tasks having not started I/O operations (DB pages of which the corresponding tasks are tasks having not started), pages corresponding to tasks having completed I/O operations (DB pages of which the corresponding tasks are tasks being in I/O operation), pages corresponding to tasks being in operation (DB pages of which the corresponding tasks are tasks being in operation), and pages corresponding to tasks having completed operations (DB pages of which the corresponding tasks are tasks having completed operation). The analysis and visualization program 195 draws all nodes and edges in a display mode corresponding to the page corresponding to the task having not started an I/O operation and then changes the display mode of nodes and edges to a display mode corresponding to a DB page state depending on the task state at a designated state. The tree illustrated in FIG. 27 illustrates a state at the time stamp "103.00". According to the DB processing information 2400 illustrated in FIG. 24, at the time stamp "103.00," the DB page #101 is a DB page referenced from the task #1 which is a task having completed operation, the DB pages #102 and #103 are DB pages referenced from the tasks #2 and #16 which are tasks being in I/O operation, and the other DB pages are DB pages referenced from tasks which are tasks having not started. Due to this, the analysis and visualization program 195 changes a display mode of nodes and edges corresponding to the DB page #101 to a display mode corresponding to a page corresponding to a task having completed operations (for example, in an animated manner, after the display modes (pages corresponding to tasks having completed I/O operations and pages corresponding to tasks being in operations) in the drawing are displayed), changes a display mode of nodes and edges corresponding to the DB pages #102 and #103 to a display mode corresponding to a page corresponding to a task having completed I/O operations, and causes a display mode of nodes and edges corresponding to the other DB pages to be left in the display mode corresponding to the page corresponding to the task having not started an I/O operation.

Figure 28:
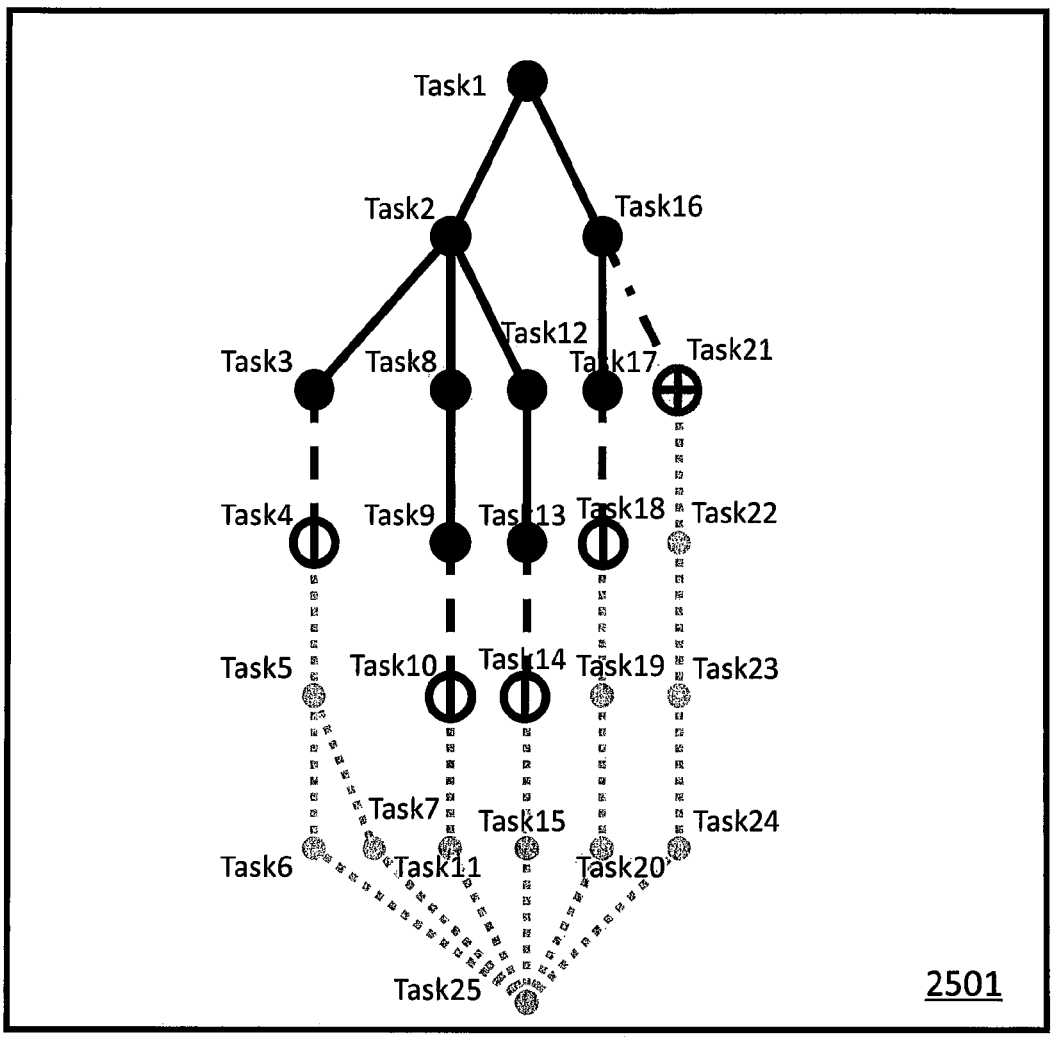
FIG. 28 illustrates an example of a task behavior visualization tree when a designated time is changed.

The analysis and visualization program 195 changes a display mode of nodes and edges of various trees to a display mode corresponding to an event type (or a previous event type closest to the designated time) of the designated time after transition with a change in the designated time (with movement of the slider 2504). For example, when a designated time changes from first time "103.00" to second time (for example, a certain time later than the first time), the analysis and visualization program 195 changes the display of a task execution visualization tree from the display illustrated in FIG. 26 to the display illustrated in FIG. 28 (for example, in an animated manner) based on the DB processing information 2400 and changes the display of the data structure visualization trees from the display illustrated in FIG. 27 to the display illustrated in FIG. 29 (for example, in an animated manner). Specifically, the analysis and visualization program 195 switches a reference destination of a record of the DB processing information 2400 with a change in the designated time and changes a display mode of nodes and edges of a task corresponding to the record based on a value (an event type, in particular) in the record that refers to the record reference destination with the switching. The analysis and visualization program 195 changes a display mode of both the task behavior visualization tree and the data structure visualization tree with a change in the designated time. That is, for example, when the state of the task #1 is changed from a task having not started to a task having completed operation as the result of the change in the designated time, the analysis and visualization program 195 changes a display mode of nodes and edges corresponding to the task #1 from the display mode of the task having not started to the display mode of the task having completed operation (in an animated manner so that an intermediate display mode is also displayed), and in line with this, changes a display mode of the DB page #101 referenced from the task #1 from the display mode of the page corresponding to the task having not started I/O operations to the display mode of the page corresponding to the task having completed operations (for example, in an animated manner so that an intermediate display mode is also displayed). Even when the designated time is changed in a forward direction (from past to future) or in a backward direction (from future to past), the analysis and visualization program 195 can switch the reference destination of a record of the DB processing information 2400 with the change and can change the display of various trees.

According to Embodiment 2, a change in the display mode of nodes and edges of various trees drawn on the visualization window 2500 changes with a change in the designated time based on the DB processing information 2400. The system administrator can specify the problem occurred by monitoring a change in the display mode of nodes and edges of various trees. For example, when the display mode of nodes and edges changes in the order of task IDs in the task behavior visualization tree, the system administrator can specify a problem that tasks were executed sequentially even if the DBMS 120 can execute tasks. Moreover, for example, when a DB page of which the display mode did not change is present in the data structure visualization tree, the system administrator can specify a problem that a task that has to access the DB page was not executed.

In Embodiment 2, when a zoom-in operation such as pressing of the zoom-in button 2505 is operated, the analysis and visualization program 195 can display a zoom-in target (for example, at least one of the task behavior visualization tree and the data structure visualization tree) at an enlarged scale. Moreover, when a zoom-out operation such as pressing of the zoom-out button 2506 is operated, the analysis and visualization program 195 can display a zoom-out target (for example, at least one of the task behavior visualization tree and the data structure visualization tree) at a reduced scale. Various modes for expansion and contraction can be employed. For example, a mode of expanding and contracting in both vertical and horizontal directions and a mode of expanding and contracting in one direction only may be provided, and the analysis and visualization program 195 may expand and contract the tree in a mode selected from the same among these modes. Moreover, a mode of adjusting an expansion/contraction ratio so that a root node is always displayed may be provided. During redrawing, the analysis and visualization program 195 may draw only edges adjacent to a node included in a region displayed on a drawing coordinate.

Figure 30:
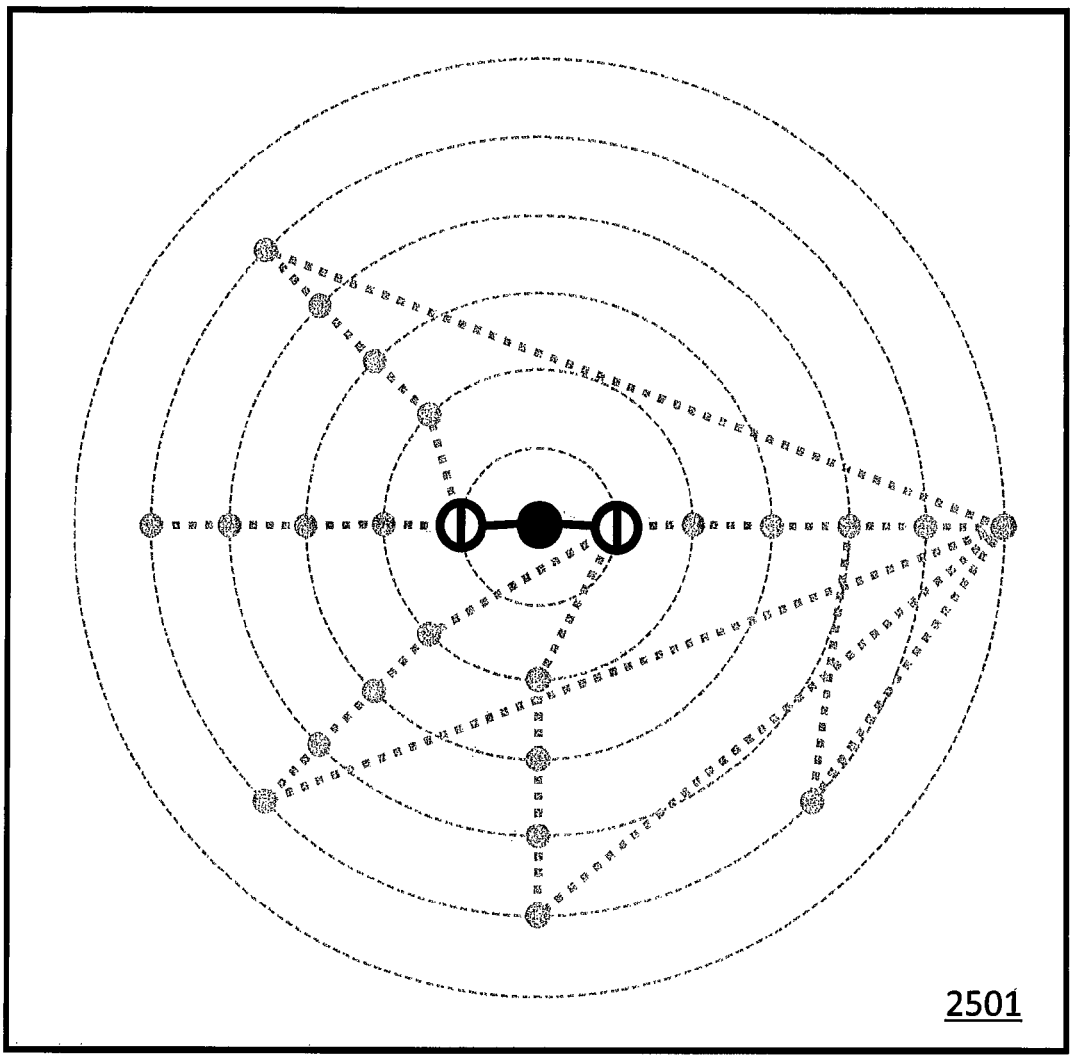
FIG. 30 illustrates an example of a radical tree as a modification of the task behavior visualization tree according to Embodiment 2.
Figure 31:
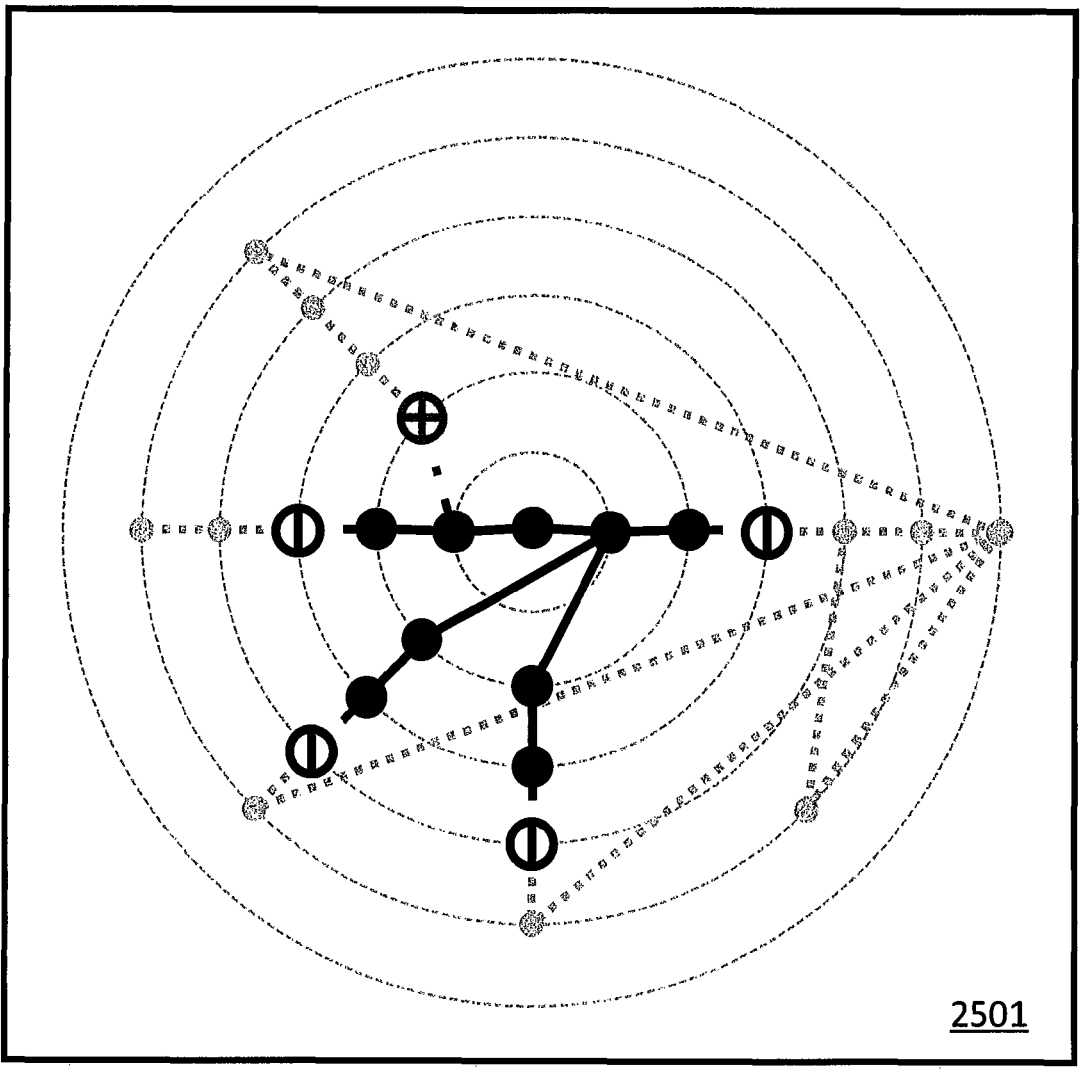
FIG. 31 illustrates an example of a radical tree when a designated time is changed.

Moreover, such a radical tree as illustrated in FIG. 30 may be employed as the task behavior visualization tree displayed in the task display area 2501. The analysis and visualization program 195 may draw such a radical tree as illustrated in FIG. 30 by arranging nodes of tasks at the same level in a concentric form around a node (the node of a root task, for example) of a certain task. The "tasks at the same level" may be tasks of the same generation from a certain task and may be tasks that access pages at the same distance from a root page of a certain data structure. In such a radical tree, for example, when a designated time changes from first time "103.00" to second time (for example, a certain time later than the first time), the analysis and visualization program 195 may change the display of the radical tree from the display illustrated in FIG. 30 to the display illustrated in FIG. 31 based on the DB processing information 2400.

Moreover, a radical tree may be employed as a modification of the data structure visualization tree.

Further, the vertical direction may be an example of a first direction, and the horizontal direction may be an example of a second direction (a direction vertical to the first direction, for example).

Furthermore, when at least one of the task behavior and the data structure (or the database) is visualized, a type of display other than the tree (for example, various visualizations described in "A Tree Visualization Reference IEEE Computer Graphics and Applications," Vol. 31, No. 6 (November 2011), pp. 11-15) may be employed.

While several embodiments have been described, the present invention is not limited to the embodiments described above but can be embodied in various forms. For example, an analysis system as below can be derived based on the above description.

An analysis system that analyzes behavior of a database management system (DBMS) that dynamically generates tasks for executing operations when processing a query to a database stored in a storage device having a plurality of storage media to execute the dynamically generated tasks in parallel, the system comprising:

a storage resource; and
a processor coupled to the storage resource,
wherein the DBMS is configured to generate event information which is a group of records including a task state after change and the time of the change, and
wherein the processor is configured to:
acquire the event information from a computer that executes the DBMS and store the event information in the storage resource; and
draw a task object which is an object indicating a task based on the event information, and change a display mode of the task object to a display mode corresponding to a task state of the task object.

The analysis system may refer to all or at least two partial records of the event information in a time-series manner and changes a display mode of the task object to a display mode corresponding to a changed state of the task of the task object. The "time-series" mentioned herein may be an old-to-new order (forward direction) of the time in records and a new-to-old order (backward direction) of the time in records.

The event information may include information indicating which task is generated by which task. The analysis system may draw an edge which indicates a generation relation of tasks and which connects task objects based on the event information.

REFERENCE SIGNS LIST 100, 180 Computer
140, 142 Network
144 Display
150 Storage apparatus
112 OS
120 DBMS
154 Controller
170 Control program
195 Analysis and visualization program
132 DB monitoring information output unit
118 OS monitoring information output unit
174 ST monitoring information output unit

The invention claimed is:
1. An analysis system for analyzing behavior of a database management system (DBMS) being configured to dynamically generates tasks for executing operations when processing a query to a database stored in a storage device having a plurality of storage media to execute the dynamically generated tasks in parallel, the system comprising:
a storage resource; and
a processor which is coupled to the storage resource,
the storage resource being configured to store thread number specifying information which specifies a largest number of threads for the query in the DBMS, first processing number specifying information which specifies a first number of I/O processing that an interface between the DBMS and the storage device can execute in parallel, second processing number specifying information which specifies a second number of I/O processing that can be executed in parallel in the storage medium of the storage device, and third processing number specifying information which specifies a third number of I/O processing that each storage medium can execute in parallel, and
the processor being configured to:
acquire a number of selected rows corresponding to a key value of an index key for a query from the DBMS;

calculate a model-based predicted degree of processing parallelism which is a degree of processing parallelism predicted based on a model of the processing corresponding to the query, based on the number of selected rows, the largest number of threads specified by the thread number specifying information, the first number of I/O processing specified by the first processing number specifying information, the second number of I/O processing specified by the second processing number specifying information, and the third number of I/O processing specified by the third processing number specifying information;

acquire, from the storage device, event information on an input-output event with respect to the storage medium when the processing corresponding to the query is actually executed;

determine a measured degree of processing parallelism which is a degree of processing parallelism when the processing corresponding to the query is actually executed based on the event information; and perform control of displaying information based on the model-based predicted degree of processing parallelism and the measured degree of processing parallelism.

2. The analysis system according to claim 1,
wherein the processor is further configured to perform control of displaying a graph so that the model-based predicted degree of processing parallelism and the measured degree of processing parallelism can be compared.

3. The analysis system according to claim 2, further comprising:
a computer that executes the DBMS and is configured to store input-output time information which specifies the time associated with random input-output when reading data, and
wherein the processor is further configured to:
acquire the input-output time information from the computer;
determine a change with time in the query, in the model-based predicted degree of processing parallelism, based on the input-output time information;
specify a change with time in the measured degree of processing parallelism based on the event information; and
display a change with time in the model-based predicted degree of processing parallelism and the measured degree of processing parallelism as a graph.

4. The analysis system according to claim 1,
wherein the processor is further configured to:
specify a number of storage media that stores data corresponding to the query;
specify a smallest value among the largest number of threads, the first number of I/O processing, and the second number of I/O processing, and divide the specified value by the number of storage media to determine the result of division as a candidate model-based predicted degree of processing parallelism; and
determine a smaller value among the candidate model-based predicted degree of processing parallelism and the third number of I/O processing as the model-based predicted degree of processing parallelism.

5. The analysis system according to claim 1,
wherein the DBMS is further configured to divide the query into a plurality of partial queries to execute respective partial queries when the query includes a plurality of partial queries, and wherein the processor is further configured to calculate the model-based predicted degree of processing parallelism and the measured degree of processing parallelism for respective partial queries.

6. The analysis system according to claim 1,
wherein the model-based predicted degree of processing parallelism and the measured degree of processing parallelism are values indicating the number of tags of the storage medium.

7. The analysis system according to claim 1,
wherein the processor is further configured to display information which specifies a query and a partial query at the time corresponding to the designated position when an optional position on the graph of the model-based predicted degree of processing parallelism is designated.

8. The analysis system according to claim 1,
wherein the storage media are a plurality of disk devices,
wherein the thread number specifying information includes a number of kernel threads in the DBMS that executes the query processing and a number of tasks per kernel thread,
wherein the first processing number specifying information includes a queue length on an I/O path of a computer in which the DBMS operates, a number of ports of the interface and a number of simultaneous I/O processing per port, and information on a network bandwidth,
wherein the second processing number specifying information includes a number of storage controllers of the storage device and a number of simultaneous I/O processing per storage controller, and
wherein the third processing number specifying information includes a number of simultaneous I/O processing per disk device.

9. The analysis system according to claim 1,
wherein the processor is further configured to:
acquire event information of a plurality of elements involved in the processing corresponding to the query in the computer system;
detect a number of stagnations of an I/O processing during execution of the processing corresponding to the query in the respective elements, based on the event information of the respective elements; and
display the number of stagnations of the element.

10. The analysis system according to claim 9,
wherein the processor is configured to display the number of stagnations of the element as a time-series graph.

11. The analysis system according to claim 1,
wherein the processor is configured to:
obtain the model-based predicted degree of processing parallelism and the measured degree of processing parallelism of the respective storage media and specify whether the measured degree of processing parallelism of each of the storage media falls within a range in which the measured degree of processing parallelism conforms to the model-based predicted degree of processing parallelism; and
display a graph which specifies the number of storage media which is out of the range in which the measured degree of processing parallelism conforms to the model-based predicted degree of processing parallelism.

12. The analysis system according to claim 1,
wherein the processor is further configured to:
obtain the model-based predicted degree of processing parallelism and the measured degree of processing parallelism of the respective storage media and specify whether the measured degree of processing parallelism of each of the storage media falls within a range in which the measured degree of processing parallelism conforms to the model-based predicted degree of processing parallelism; and display a diagram which specifies whether the respective storage media are in the range in which the measured degree of processing parallelism conforms to the model-based predicted degree of processing parallelism.

13. The analysis system according to claim 1,
wherein the processor is further configured to:
calculate a non-conformity ratio which is the ratio of a period in which the measured degree of processing parallelism is out of a range in which the measured degree of processing parallelism conforms to the model-based predicted degree of processing parallelism, to an execution period of the processing corresponding to the query, for each of the storage media; and display information on the plurality of storage media in descending order of the non-conformity ratio.

14. The analysis system according to claim 1,
wherein the DBMS is configured to generate event information which is a group of records including a task state after change and the time of the change, and
wherein the processor is further configured to:
(A) acquire the event information from a computer that executes the DBMS and stores the event information in the storage resource; and
(B) draw a task object which is an object indicating a task based on the event information, and change a display mode of the task object to a display mode corresponding to a task state of the task object.

15. The analysis system according to claim 14,
wherein the event information includes information indicating a task which is executed to generate each task and information indicating a generation order of one or a plurality of tasks generated by execution of a certain task,
wherein the task object is a node, and
wherein, in (B), the processor is further configured to draw a graph in which an edge indicating a generation relation and a generation order of respective tasks is present between nodes.

16. The analysis system according to claim 14,
wherein, in (B), the processor is further configured to:
draw the task object in different modes depending on a task state; and
display detailed information including information on an object of a DB accessed by a task designated by a user.

17. The analysis system according to claim 14,
wherein, in (B), the processor is further configured to change a display mode of the task object with time according to a change in a task state when all or at least two partial records of the event information are referred in a time-series manner.

18. The analysis system according to claim 14,
wherein, in (B), the processor is further configured to switch between a display mode of displaying all task objects and a display mode of displaying a portion of the task objects at an enlarged scale according to a user instruction.

19. The analysis system according to claim 14, further comprising:

a computer that executes the DBMS and is configured to store data structure summary information indicating the summary of a data structure of the database,
wherein a record of the event information includes an ID of an access destination page of a task corresponding to the record, and
wherein the processor is further configured to:
(C) acquire the data structure summary information from the computer and stores the data structure summary information in the storage resource; and
(D) draw a page object which is an object indicating a page which is an area in which data is stored based on the data structure summary information, and changes a display mode of the page object to a display mode corresponding to a state of a task that accesses the page.

20. The analysis system according to claim 19,
wherein the page object is a node, and
wherein, in (D), the processor is further configured to draw for each data structure of the database, a graph in which an edge indicating a dependency between pages is present between nodes.

21. The analysis system according to claim 19,
wherein, in (D), the processor is further configured to:
draw the page object in different modes depending on a page access state; and
display detailed information including a logical and physical address of a page that is designated by a user.

22. The analysis system according to claim 19,
wherein, in (D), the processor is further configured to change a display mode of the page object with time according to a change in a task state when all or at least two partial records of the event information are referred in a time-series manner.

23. The analysis system according to claim 19,
wherein, in (D), the processor can is further configured to switch between a display mode of displaying all page objects and a display mode of displaying a portion of the page objects at an enlarged scale according to a user instruction.

24. A computer system comprising:
a computer being configured to execute a database management system (DBMS) which is configured to dynamically generate tasks for executing operations when processing a query to a database stored in a storage device having a plurality of storage media to execute the dynamically generated tasks in parallel; and
an analysis system being configured to analyze behavior of the DBMS,
wherein the analysis system includes a storage resource and a processor coupled to the storage resource,
the storage resource being configured to store thread number specifying information which specifies a largest number of threads for the query in the DBMS, first processing number specifying information c which specifies a first number of I/O processing that an interface between the DBMS and the storage device can execute in parallel, second processing number specifying information which specifies a second number of I/O processing that can be executed in parallel in the storage medium of the storage device, and third processing number specifying information which specifies a third number of I/O processing that each storage medium can execute in parallel, and
the processor being configured to:
acquire a number of selected rows corresponding to a key value of an index key for a query from the DBMS;

calculate a model-based predicted degree of processing parallelism which is a degree of processing parallelism predicted based on a model of the processing corresponding to the query, based on the number of selected rows, the largest number of threads specified by the thread number specifying information, the first number of I/O processing specified by the first processing number specifying information, the second number of I/O processing specified by the second processing number specifying information, and the third number of I/O processing specified by the third processing number specifying information;

acquire, from the storage device, event information on an input-output event with respect to the storage medium when the processing corresponding to the query is actually executed;

determine a measured degree of processing parallelism which is a degree of processing parallelism when the processing corresponding to the query is actually executed based on the event information; and perform control of displaying information based on the model-based predicted degree of processing parallelism and the measured degree of processing parallelism.

25. An analysis method for analyzing behavior of a database management system (DBMS) being configured to dynamically generate tasks for executing operations when processing a query to a database stored in a storage device having a plurality of storage media to execute the dynamically generated tasks in parallel, the analysis method comprising:

acquiring a number of selected rows corresponding to a key value of an index key for a query from the DBMS;

processing for calculating a model-based predicted degree of processing parallelism which is a degree of processing parallelism predicted based on a model of the processing corresponding to the query, based on the number of selected rows, a largest number of threads specified by the thread number specifying information, a first number of I/O processing that an interface between the DBMS and the storage device can execute in parallel, a second number of I/O processing that can be executed in parallel in the storage medium of the storage device, and a third number of I/O processing that the storage medium can execute in parallel, acquiring event information on an input-output event with respect to the storage medium when the processing corresponding to the query is actually executed;

determining a measured degree of processing parallelism which is a degree of processing parallelism when the processing corresponding to the query is actually executed based on the event information; and performing control of displaying information based on the model-based predicted degree of processing parallelism and the measured degree of processing parallelism.

* * * * *